United States Patent
Ise et al.

(10) Patent No.: US 10,629,901 B2
(45) Date of Patent: Apr. 21, 2020

(54) PRODUCTION METHOD OF BATTERY ACTIVE MATERIAL, BATTERY ACTIVE MATERIAL, NONAQUEOUS ELECTROLYTE BATTERY AND BATTERY PACK

(71) Applicant: Kabushiki Kaisha Toshiba, Minato-ku (JP)

(72) Inventors: Kazuki Ise, Fuchu (JP); Yasuhiro Harada, Yokohama (JP); Norio Takami, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/645,675

(22) Filed: Jul. 10, 2017

(65) Prior Publication Data

US 2017/0309906 A1 Oct. 26, 2017

Related U.S. Application Data

(62) Division of application No. 14/534,679, filed on Nov. 6, 2014, now abandoned.

(30) Foreign Application Priority Data

| Nov. 8, 2013 | (JP) | 2013-232408 |
| Sep. 18, 2014 | (JP) | 2014-190590 |

(51) Int. Cl.
| H01M 4/48 | (2010.01) |
| H01M 4/485 | (2010.01) |
| C01G 33/00 | (2006.01) |
| H01M 10/052 | (2010.01) |

(52) U.S. Cl.
CPC ............ *H01M 4/483* (2013.01); *C01G 33/00* (2013.01); *C01G 33/006* (2013.01); *C01P 2002/52* (2013.01); *C01P 2002/72* (2013.01); *C01P 2002/77* (2013.01); *C01P 2002/88* (2013.01); *C01P 2004/03* (2013.01); *H01M 10/052* (2013.01); *H01M 2220/20* (2013.01)

(58) Field of Classification Search
CPC .......... H01M 4/36; H01M 4/48; H01M 4/485; H01M 4/583; H01B 1/02
See application file for complete search history.

(56) References Cited

U.S. PATENT DOCUMENTS

| 8,647,773 | B2 | 2/2014 | Goodenough et al. |
| 9,136,532 | B2 | 9/2015 | Harada |
| 9,240,590 | B2 | 1/2016 | Harada |
| 2011/0206991 | A1 | 8/2011 | Nakahara |
| 2012/0052401 | A1 | 3/2012 | Goodenough et al. |
| 2012/0107692 | A1 | 5/2012 | Harada et al. |
| 2012/0244442 | A1 | 9/2012 | Harada et al. |
| 2015/0086872 | A1* | 3/2015 | Ise .................. H01M 4/485 429/231.5 |
| 2015/0364758 | A1 | 12/2015 | Harada et al. |

FOREIGN PATENT DOCUMENTS

| CN | 101172654 A | 5/2008 |
| CN | 102694160 A | 9/2012 |
| CN | 102983316 A | 3/2013 |
| CN | 103081187 A | 5/2013 |
| JP | WO 2009/099156 A1 | 8/2009 |
| JP | 2009-292680 A | 12/2009 |
| JP | 2010-287496 | 12/2010 |
| JP | 2012-99287 | 5/2012 |
| JP | 2012-199146 | 10/2012 |
| JP | 2013-75773 | 4/2013 |

OTHER PUBLICATIONS

Jian-Tao Han et al., , "New Anode Framework for Rechargeable Lithium Batteries", Chemistry of Materials, 2011 , 23, pp. 2027-2029.

* cited by examiner

*Primary Examiner* — Haidung D Nguyen
(74) *Attorney, Agent, or Firm* — Oblon, McClelland, Maier & Neustadt, L.L.P.

(57) ABSTRACT

A production method of a battery active material of the present embodiment includes a step of obtaining a coprecipitated product containing Ti and Nb by mixing a solution with a pH of 5 or lower, in which a Ti compound is dissolved, and a solution with a pH of 5 or lower, in which a Nb compound is dissolved, such that molar ratio of Ti and Nb (Nb/Ti) is adjusted within a range of $1 \leq Nb/Ti \leq 28$, and then further mixing with an alkali solution with a pH of 8 or higher; and a step of burning the coprecipitated product under condition of 635° C. or higher and 1200° C. or lower.

13 Claims, 12 Drawing Sheets

PRODUCTION METHOD OF BATTERY ACTIVE MATERIAL, BATTERY ACTIVE MATERIAL, NONAQUEOUS ELECTROLYTE BATTERY AND BATTERY PACK

CROSS REFERENCE TO RELATED APPLICATION

This application is a divisional of U.S. patent application Ser. No. 14/534,679, filed on Nov. 6, 2014, the text of which is incorporated by reference, and claims the benefit of the filing dates of Japanese Application 2013-232408, filed on Nov. 8, 2013 and Japanese Application 2014-190590, filed on Sep. 18, 2014, the text of both of which are also incorporated by reference.

FIELD

Embodiments described herein relate generally to a production method of a battery active material, a battery active material obtained by this production method, a nonaqueous electrolyte battery, and a battery pack.

BACKGROUND

In recent years, nonaqueous electrolyte batteries such as lithium ion secondary batteries have been developed as batteries with high energy density. The nonaqueous electrolyte batteries are anticipated as vehicular power sources such as hybrid vehicles or electric vehicles. In particular, in vehicular use applications, the nonaqueous electrolyte batteries are required to have characteristics such as high-speed charging and discharging performance and long-term reliability. The nonaqueous electrolyte batteries capable of performing high-speed charging and discharging have the advantage that a charging time is considerably short. In hybrid vehicles on which the nonaqueous electrolyte batteries capable of performing high-speed charging and discharging are mounted, power performance can be improved. Moreover, in the hybrid vehicles, regenerative energy of power can be efficiently collected.

The high-speed charging and discharging can be realized by rapid movement of electrons and lithium ions between a positive electrode and a negative electrode. Conventional nonaqueous electrolyte batteries include carbon-based negative electrodes having a negative electrode active material formed of a carbonaceous matter. In nonaqueous electrolyte batteries using carbon-based negative electrodes, dendrites of metal lithium on negative electrodes may precipitate when high-speed charging and discharging are repeated. Dendrites may cause internal short-circuit.

Accordingly, to prevent dendrites of metal lithium from precipitating, batteries including a composite metal oxide as a negative electrode active material instead of a carbonaceous matter have been developed. In particular, batteries using a titanium oxide as a negative electrode active material can perform stable high-speed charging and discharging and have characteristics of a longer lifespan than a carbon-based negative electrode.

However, the potential of a titanium oxide with respect to metal lithium is higher (nobler) than that of a carbonaceous matter. Further, an electric capacity per weight of a titanium oxide is low. Therefore, there is a problem in that a weight energy density is lower in batteries using a titanium oxide.

For example, an electrode potential of a titanium oxide is about 1.5 V based on metal lithium and is higher (nobler) than the potential of a carbon-based negative electrode.

Since the potential of a titanium oxide is caused by an oxidation-reduction reaction between $Ti^{3+}$ and $Ti^{4+}$ when lithium is electrochemically inserted and desorbed, the potential of the titanium oxide is electrochemically restricted. Also, there is the fact that stable high-speed charging and discharging of lithium ions can be performed in a high electrode potential of about 1.5 V. Thus, it is actually difficult to reduce an electrode potential to improve high energy density per unit weight.

For an electric capacity per unit weight, the theoretical capacity of a lithium-titanium composite oxide such as $Li_4Ti_5O_{12}$ is about 175 mAh/g. On the other hand, the theoretical capacity of a general graphite-based electrode material is 372 mAh/g. Accordingly, a capacity density of a titanium oxide is considerably lower than that of a carbon-based negative electrode. This is because the number of sites occluding lithium is small in a crystal structure of the titanium oxide. Also, because lithium is likely to be stabilized in a structure, it is difficult that lithium moves between a positive electrode and a negative electrode, which reduces a substantial electrode potential. That is also another reason.

In view of the above description, new electrode materials containing Ti and Nb have been examined. In particular, a composite oxide represented by $TiNb_2O$ has a high theoretical capacity of 387 mAh/g because charge compensations of tetravalent Ti to trivalent Ti and pentavalent Nb to trivalent Nb occur when Li is inserted, and attracts attention.

As a production method of a composite oxide represented by $TiNb_2O_7$, the synthesis methods of a solid-phase reaction method, a hydrothermal synthesis method and a sol-gel method are known.

In $TiNb_2O_7$, a Li diffusion rate in solid is slow at high SOC (State Of Charge: charging rate of battery), and thus, an overvoltage is large. Thus, the nonaqueous electrolyte battery, which includes $TiNb_2O_7$ as a battery active material, has a problem in that charging and discharging cycle performance is poor at high SOC. In order to solve this problem, it is necessary to make a particle size of an active material as small as possible However, in a conventional solid-phase reaction method, a raw material is solid, and a reaction needs to be carried out by burning-induced elemental diffusion. Thus, burning at a burning temperature of 1000° C. or higher for at least several tens of hours is required in order to obtain a composite oxide prepared by homogeneously mixing Nb and Ti elements. As a result, burned particles become coarse particles, and particle sizes become 1 μm or more. Coarsened particles can be subjected to microparticulation using a mechanical grinding method such as a beads mill, but crystallinity is lowered at the same time as grinding, and thus, battery characteristics can be deteriorated.

Also, a production method, which uses a sol-gel method using $Ti(OC_3H_7)_4$ and niobium hydroxide, is known, but it is difficult to form a precursor in which Ti and Nb sources are homogeneously mixed. Thus, burning using high temperature of 1350° C. is carried out, and consequently, coarse particles can be formed.

Also, there is a hydrothermal synthesis method as a method for obtaining microparticles. This hydrothermal synthesis method requires pressurization due to a pressure-resistant closed vessel, corrosion of a closed container can occur during the mass production. Moreover, $TiO_2$ anatase phase can be formed as a heterophase instead of a phase formed of Nb—Ti composite oxide at the time of a hydrothermal treatment, and there are possibilities that uniformity of burned Ti and Nb elements can be deteriorated and that crystallinity is lowered.

DETAILED DESCRIPTION

Figure 1:
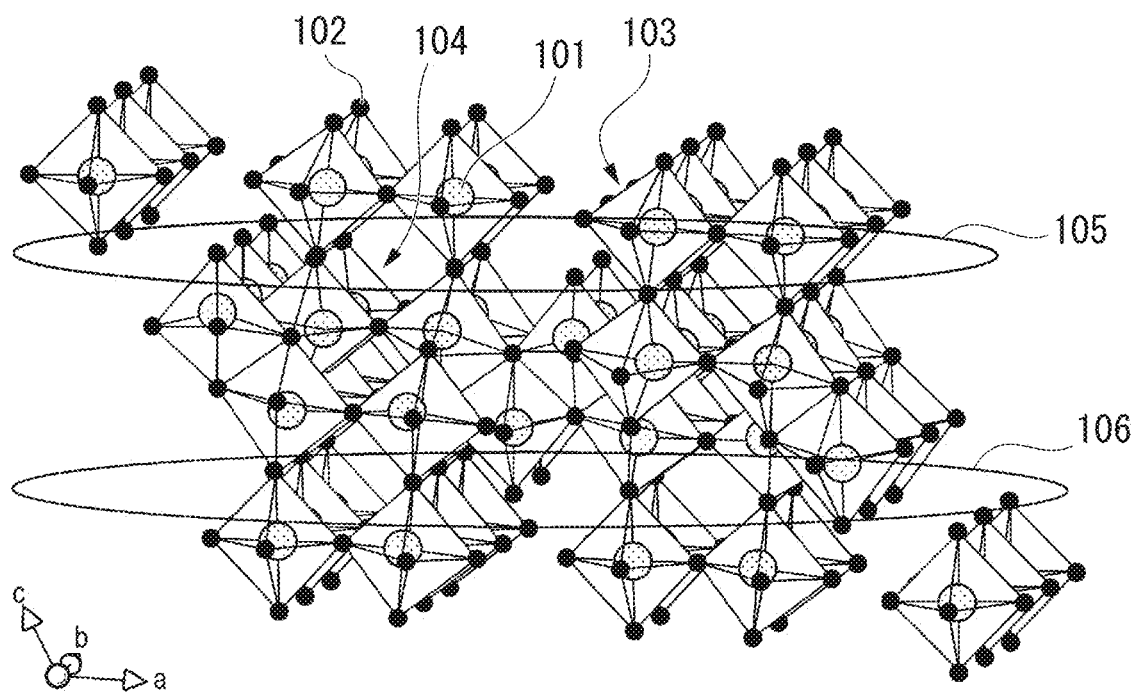
FIG. 1 is a schematic diagram illustrating a crystal structure of monoclinic type $TiNb_2O_7$ according to a first embodiment.

A production method of a battery active material of the embodiment includes a step of obtaining a coprecipitated product containing Ti and Nb and a step of burning the coprecipitated product under condition of a burning temperature of 635° C. or higher and 1200° C. or lower.

In the step of obtaining a coprecipitated product, a solution with a pH of 5 or lower, in which a Ti compound is dissolved, and a solution with a pH of 5 or lower, in which a Nb compound is dissolved, are mixed, and then mixed with an alkali solution with a pH of 8 or higher.

The solution with a pH of 5 or lower, in which a Ti compound is dissolved, and a solution with a pH of 5 or lower, in which a Nb compound is dissolved, are mixed such that molar ratio of Ti and Nb (Nb/Ti) is adjusted within a range of $1 \leq Nb/Ti \leq 28$.

In the step of burning, the coprecipitated product is burned under the condition of a burning temperature of 635° C. or higher and 1200° C. or lower.

Hereinafter, a production method of a battery active material, a battery active material, a nonaqueous electrolyte battery and a battery pack according to embodiments will be described with reference to the drawings. The same reference signs are put to the common features in the embodiments, and duplicative descriptions are omitted. Also, the respective drawings are schematic diagrams for supporting the description and comprehension of the embodiments. The shape, size and ratio illustrated in the drawings are different from actual devices, but design changes can be appropriately carried out with reference to the following description and publicly known techniques.

[First Embodiment]

As a result of the extensive studies, the inventors have developed the production method of a niobium-titanium composite oxide using a coprecipitation method. According to the new production method, it is possible to synthesize line and highly crystalline particles. One example of the production method includes a step of obtaining a coprecipitated product containing Ti and Nb and a step of burning the coprecipitated product under condition of a burning temperature of 635° C. or higher and 1200° C. or lower. In the step of obtaining a coprecipitated product, a solution with a pH of 5 or lower, in which a Ti compound is dissolved, and a solution with a pH of 5 or lower, in which a Nb compound is dissolved, are mixed, and then further mixed with an alkali solution with a pH of 8 or higher. The solution, in which a Ti compound is dissolved, and a solution, in which a Nb compound is dissolved, are mixed such that molar ratio of Ti and Nb (Nb/Ti) is adjusted within a range of $1 \leq Nb/Ti \leq 28$. In the step of burning the coprecipitated product, the coprecipitated product is burned under the condition of a burning temperature of 635° C. or higher and 1200° C. or lower.

In another example of the production method of fine and highly crystalline particles, a coprecipitated product containing Ti and Nb can be obtained by mixing a solution, in which a Ti compound and a Nb compound are dissolved, is mixed with an alkali solution with a pH of 8 or higher, and then the coprecipitated product can be burned. In the solution in which a Ti compound and a Nb compound are dissolved, molar ratio of Ti and Nb (Nb/Ti) is adjusted within a range of $1 \leq Nb/Ti \leq 28$, and a pH is adjusted to 5 or lower. A burning temperature of the coprecipitated product is adjusted within a range of 635° C. or higher and 1200° C. or lower.

A battery active material obtained by the production method of the present embodiment is a niobium-titanium composite oxide represented by $Ti_{x-a}M1_aNb_{y-b}M2_bO_z$. In the compositional formula, $z=2(x+a)+2.5(y+b)$ is satisfied; x, y, a, b and z respectively satisfy $1 \leq (y-b)/(x-a) \leq 28$, $0 \leq x \leq 1$, $0 < y \leq 1$, $0 < a < 0.1$ and $0 \leq b = 0.1$; M1 and M2 each independently represents one, or two or more elements selected from Ti, Nb, Zr, B, Na, Mg, Al, Si, S, P, K, Ca, Mo, W, Cr, Mn, Co, Ni and Fe.

The composition of a battery active material can be adjusted by adjusting the molar ratio of Ti and Nb (Nb/Ti) within a range of 1≤Nb/Ti≤28. Thereby, it is possible to obtain a battery active material having a small particle size and being excellent in charging and discharging cycle performance and a weight energy density.

A niobium-titanium composite oxide is a composite oxide containing titanium element and a niobium element referred to as a Wadsley-Roth phase. In this composite oxide, the octahedrons, which are formed by oxygen ions and metal ions composed of Nb elements and Ti elements, form blocks while sharing the vertexes. Also, the side-sharing structures or the tetrahedral structures, which are formed by oxygen ions and metal ions composed of Nb elements and Ti elements, are sandwiched between the blocks, and are bonded so as to be laminated in one axis direction. This composite oxide has several phases such as $TiNb_2O_7$, $Ti_2Nb_{10}O_{29}$, $TiNb_{14}O_{37}$ and $TiNb_{24}O_{62}$, the molar ratio of Nb/Ti determines which phase is formed among these crystal phase. The more preferable molar ratio of Nb/Ti is within a range of 1≤Nb/Ti≤3, and it is desirable that the active material has a $TiNb_2O_7$ phase. $TiNb_2O_7$ is attributed to monoclinic C2/m, and octahedrons, which are formed by oxygen ions and metal ions comprised of Nb elements and Ti elements, form a block of vertically 3 pieces and horizontally 3 pieces while sharing the vertexes. Also, the blocks are bonded by side-sharing to thereby form a layer, and these layers are laminated in b-axis direction. Because the structure of $TiNb_2O_7$ has the broadest vacant spaces among the niobium-titanium composite oxides, $TiNb_2O_7$ is characterized in that the capacity is the highest. Also, when the molar ratio is other than Nb/Ti=2, 5, 14 and 24, a mixed phase, which contains two or more of $TiNb_2O_7$, $Ti_2Nb_{10}O_{29}$, $TiNb_{14}O_{37}$ and $TiNb_{24}O_{62}$, can appears. A material with a large Nb/Ti ratio is characterized by small capacity and large rate characteristics, and thus rate characteristics can be improved by preparing a mixed phase. In the case of 1≤Nb/Ti≤2, both of rutile type $TiO_2$ and $TiNb_2O_7$ can be obtained as a mixed phase. In this case, rutile type $TiO_2$ absorbs Li, and a part of the absorbed Li remains therein, which improve electronic conductivity. Thus, the rate characteristics of $TiNb_2O_7$ are improved. The Nb/Ti ratio is determined according to the design and use application of a battery.

A primary particle size of the battery active material according to the first embodiment is preferably 2 μm or less, more preferably 0.01 μm or more and 1 μm or less, and much more preferably 0.5 μm or less. When the primary particle size is within the range, it is possible to obtain good rate characteristics. The primary particle size is determined by counting primary particle sizes of 100-1000 or more primary particles through the observation of a SEM image, followed by calculating an average particle size.

A BET specific surface area of the battery active material according to the first embodiment is preferably 0.1 $m^2$/g or more and less than 50 $m^2$/g, and more preferably 1.0 $m^2$/g or more and less than 30 $m^2$/g. When the BET specific surface area is 0.1 $m^2$/g or more, it is possible to ensure contact area between the battery active material and a electrolyte and to obtain good rate characteristics. Meanwhile, when the BET specific surface area is less than 50 $m^2$/g, it is possible to improve the coating property of the slurry containing the battery active material. The BET specific surface area is measured by using a $N_2$ gas absorption method.

The battery active material may be granulated.

The niobium-titanium composite oxide, which is contained in the battery active material according to the first embodiment and is represented by the general formula: $Ti_{x-a}M1_aNb_{y-b}M2_bO_z$ (wherein z=2(x+a)+2.5(y+b)), can be represented by the general formula: $Li_mTi_{x-a}M1_a Nb_{y-b}M2_bO_z$ (wherein 0≤m≤x+2y) depending on the charging condition of a battery when being incorporated in a nonaqueous electrolyte battery. This means that the aforementioned compound can contain Li in the amount of 0 to (x+2y) mol per 1 mol thereof when being represented by the aforementioned composition.

<Crystal Structure of $TiNb_2O_7$>

Figure 2:
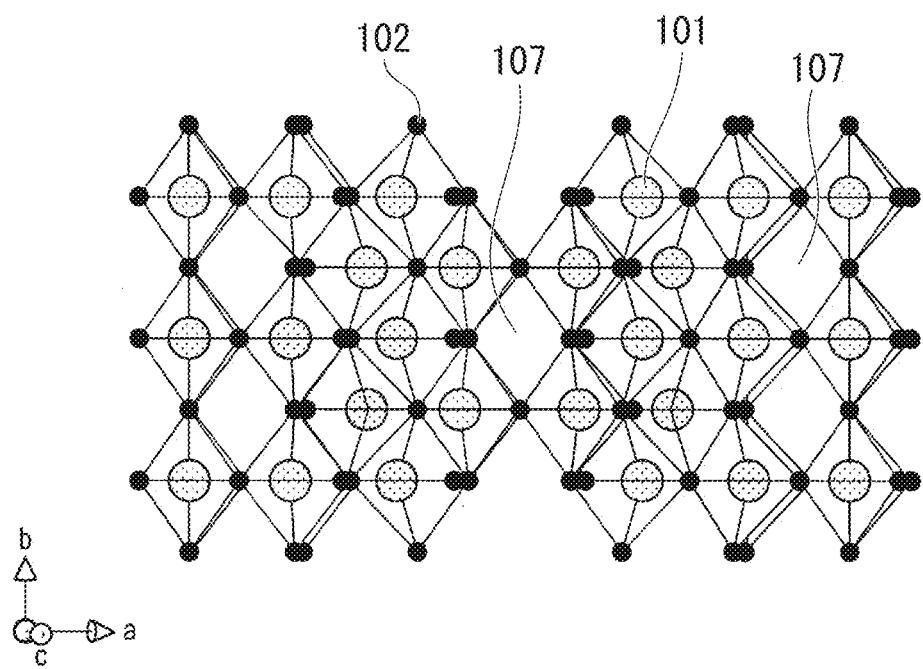
FIG. 2 is a schematic diagram illustrating the crystal structure illustrated in FIG. 1 in another direction.

Herein, the schematic diagram of the crystal structure of $TiNb_2O_7$, which is one of the battery active materials according to the present embodiment, is described with reference to FIG. 1 and FIG. 2. As illustrated in FIG. 1 and FIG. 2, in the crystal structure of the monoclinic type $TiNb_2O_7$, metal ions 101 and oxide ions 102 form skeletal structure portions 103. In the metal ions 101, Nb ions and Ti ions are disposed at random at a ratio of Nb:Ti=2:1. When the skeletal structure portions 103 are disposed alternately 3-dimensionally, gap portions 104 are formed between the skeletal structure portions 103. The gap portions 104 are hosts of lithium ions.

In FIG. 1 and FIG. 2, the regions 105 and 106 are the portions that have 2-dimensional channels in the [100] and [010] directions. As illustrated in FIG. 2, the gap portions 107 are present in the [001] direction in the respective regions of the crystal structure of the monoclinic type $TiNb_2O_7$. The gap portions 107 have a tunnel structure which is advantageous to conductivity of lithium ions and serve as conductive paths in the [001] direction connecting the regions 105 and 106. Because the conductive paths are present, lithium ions can reciprocate between the regions 105 and 106.

In this manner, the monoclinic type crystal structure has a large insertion space equivalent to lithium ions, and is structurally stable. The 2-dimensional channel-including regions, in which diffusion of lithium ions is fast, and the conductive path in the [001] direction connecting the regions are present in the monoclinic type crystal structure. Thereby, insertion and desorption of the lithium ions into and from insertion spaces are improved, and insertion and desorption spaces of the lithium ions are effectively increased. Thus, it is possible to provide a high capacity and high rate performance.

In the aforementioned crystal structure, when lithium ions are inserted into the gap portions 104, the metal ions 101 forming the skeleton are reduced to trivalence, and crystalline electro-neutrality is accordingly maintained. In the niobium-titanium composite oxide of the present embodiment, not only are Ti ions reduced from tetravalent to trivalent, but Nb ions are also reduced from pentavalence to trivalence. Therefore, a reduction valence per active material mass is large. For this reason, even when many lithium ions are inserted, the crystalline electro-neutrality can be maintained. Therefore, the energy density is higher than that of a compound such as a titanium oxide containing only tetravalent cations. The theoretical capacity of the niobium-titanium composite oxide of the present embodiment is about 387 mAh/g, which is at least twice value of the theoretical capacity of a titanium oxide having a spinel structure.

The niobium-titanium composite oxide has a lithium absorption potential of about 1.5 V (vs Li/Li$^+$). Therefore, by using the active material, it is possible to provide a battery that can perform stable charging and discharging repeatedly at a high speed.

For the above reasons, by using the active material containing the niobium-titanium composite oxide, it is possible to provide a battery active material with good high-speed charging and discharging performance and high energy density.

Particularly in TiNb$_2$O$_7$ phase among the battery active materials produced in the present embodiment, it is preferable that peak intensity ratio ($I_B/I_A$) satisfy $I_B/I_A \leq 0.80$, the peak intensity ratio ($I_B/I_A$) being the ratio of the peak A, which appears at 2θ=25.61° to 26.21° in a X-ray diffraction diagram obtained by an X-ray diffraction method using Cu-Kα ray and is attributed to a (003) plane, and the peak B, which appears at 2θ=26.12° to 26.54° and is attributed to a (−602) plane.

The peak intensity ratio $I_B/I_A$ of less than 0.8 means that crystal growth on a (−602) plane having difficulty in Li diffusion is suppressed. By having this feature together with the small primary particle shape and the small specific surface area, it is considered that charging and discharging capacity or rate characteristics are improved.

The X-ray diffraction diagram of the battery active material according to the first embodiment can be obtained by an X-ray diffraction method (X-ray diffraction: XRD) using Cu-Kα ray. As an X-ray diffraction method, a wide-angle X-ray diffraction method can be exemplified.

Hereinafter, the wide-angle X-ray diffraction, which is one example usable to obtain a X-ray diffraction diagram of the battery active material according to the first embodiment will be described.

Firstly, a sample subjected to measurement, i.e. the battery active material according to the first embodiment, is pulverized such that aggregations thereof are sufficiently loosened. As a guideline, it is preferable that the average particle size become 10 μm or less. The average particle size can be obtained by a laser diffraction type particle size distribution measuring apparatus. The pulverized sample is filled into the holder portion of a glass sample plate equipped with a holder portion. As a sample stage, it is possible to use a glass sample plate having a holder portion with depth of 0.2 mm, for example. After the sample was filled in the holder portion, this sample is pressed using a glass plate sufficiently to smooth the surface thereof. The glass sample plate, in which the sample is filled in the manner described above, is placed in a powder X-ray diffractometer, and the measurement due to X-ray diffraction method using Cu-Kα ray is carried out.

The measurement can be carried out using the following measuring apparatus and measurement conditions, for example.

X-ray diffractometer: "SmartLab" manufactured by Rigaku Corporation
  X-ray source: CuKα ray
  Output: 40 kV, 200 mA
  Package measurement name: general-purpose measurement (a concentration method)
  Incidental parallel slit aperture angle: 5°
  Incidental longitudinal-limiting slit length: 10 mm
  Light-receiving PSA: N/A
  Light-receiving parallel slit aperture angle: 5°
  Monochromatic method: Kβ filter method
  Measurement mode: continuation
  Incidental slit width: 0.5°
  Light-receiving slit width: 20 mm
  Measurement range (2θ): 5° to 70°
  Sampling width (2θ): 0.01°
  Scanning speed: 20°/min.

When the peak intensity ratio is calculated, removal of background, separation, smoothing and fitting, etc. of Kα1 and Kα2 peaks are not carried out in order to avoid estimation errors resulting from a data processing method. Instead, the peak intensity ratio is calculated from the intensities of the respective peaks of the measured data including the measured Kα1 and Kα2 rays.

When wide-angle X-ray diffraction measurement is carried out for the battery active material contained in an electrode the following procedure can be used, for example.

Firstly, in order to ensure the crystalline state of the battery active material, a niobium-titanium composite oxide is prepared to be in a lithium-free state by completely desorbing lithium ions from a niobium-titanium composite oxide.

For example, when measurement is carried out for battery active material contained in a negative electrode, a battery is prepared to be in a completely discharged state. However, slightly remaining lithium ions may exist even in a discharged state. Next, a battery is disassembled in a glove box filled with argon, and an electrode is washed using an appropriate solvent. As the solvent to be used herein, non-aqueous solvent of nonaqueous electrolyte such as ethyl methyl carbonate is preferably used when the battery is a nonaqueous electrolyte battery. Then, a negative electrode material layer is detached from the washed negative electrode. In this case, the peaks of a current collector foil, a conductive auxiliary agent and a binder are preliminarily measured using XRD, and the peak positions derived therefrom are confirmed. When there are the peaks overlapping those of active material particles, it is necessary to separate the materials having the peaks other than those of active material particles. By measuring an electrode recovered from a battery in this manner, it is possible to carry out a wide-angle X-ray diffraction measurement for the active material particles contained in a battery.

<Production Method>

A production method of a battery active material according to the present embodiment is described in details.

Firstly, the acid solution in which a Ti compound is dissolved (hereinafter, may be referred to the acid solution (A)), and the acid solution in which a Nb compound is dissolved (hereinafter, may be referred to the acid solution (B)) are mixed.

The respective acid solutions (A) and (B) to be used has pH of 5 or lower, and preferably pH of 2 or lower. By using the respective acid solutions (A) and (B) having pH of 5 or lower, it is possible to stably hold Ti compounds or Nb compounds in a dissolved state by a solvent. Furthermore, hydrolysis does not occur before mixing with an alkaline solution, and it is possible to prevent the gelation of the respective acid solutions (A) and (B).

The starting materials of the respective acid solutions (A) and (B) are not particularly limited, and the solution, which is obtained by dissolving the hydroxides, sulfides, oxides, salts, alkoxides and manic materials, each containing Ti or Nb, in a suitable solvent such as pure water, ethanol and an acid, is used.

The starting materials are not particularly limited, and examples of a Ti compound include titanyl sulfate (TiOSO$_4$), titanium oxide (TiO$_2$), titanium oxalate ammonium ((NH$_4$)$_2$TiO(C$_2$O$_4$)·H$_2$O), metatitanic acid (TiO(OH)$_2$), isopropyl titanate (C$_{12}$H$_{28}$O$_4$Ti) and titanium chloride (TiCl$_4$).

Also, examples of a Nb compound include niobium chloride (NbCl$_5$), niobium hydroxide (Nb(OH)), ammonium niobium oxalate (C$_2$H$_8$N$_2$O$_4$·Nb), niobium oxide (Nb$_2$O$_5$) and niobium ethoxide (Nb(OCH$_2$H$_5$)$_5$).

A solution containing the solute stable to an aqueous solution can be used while being directly mixed with others. However, in the case of using a metal chloride or a metal alkoxide, etc., hydrolysis may progress, and it may be difficult to obtain coprecipitated product. Thus, it is necessary to suppress water content of a solution. The temperature at the time of mixing is preferably a normal temperature, but it is possible to heat a solution in the case of using a starting material which is difficult to be dissolved.

The molar concentration of Ti in the acid solution (A) is not particularly limited, but is preferably within the range of 0.01 to 10 mol/L and more preferably within the range of 0.1 to 5.0 mol/L.

Also, the molar concentration of Nb in the acid solution (B) is not particularly limited, but is preferably within the range of 0.01 to 10 mol/L, and more preferably within the range of 0.1 to 5.0 mol/L.

When the molar concentrations of Ti and Nb in the acid solutions (A) and (B) are not less than the aforementioned lower limits, the molar concentrations of Ti and Nb are not too low, and consequently, the precipitation amount of the coprecipitated product are sufficiently. Furthermore, productivity is improved. Also, when the molar concentrations of Ti and Nb in the acid solutions (A) and (B) are not more than the aforementioned upper limits, the molar concentrations of Ti and Nb are not too high, and consequently, hydrolysis is hardly to occur. Furthermore, it is possible to stably produce the coprecipitated product, and the quality of a battery active material is improved.

When the acid solutions (A) and (B) are mixed, the mixing ratio of the acid solutions (A) and (B) is adjusted such that the molar ratio (Nb/Ti) of Nb/Ti is within the range of 1≤Nb/Ti≤28. The more preferable molar ratio (Nb/Ti) is 1.3≤Nb/Ti≤2.4. The molar ratio used herein indicates the molar ratio at the time of using, which may be different from the composition ratio of Nb and Ti in the produced active material. The solvent obtained as described above is a liquid having fluidity, and hydrolysis does not occur, and also, the solvent is not gelatinized.

In the present embodiment, the acid solutions (A) and (B) can be separately prepared before mixing, and alternatively, it is possible to prepare the solution in which a Ti compound and a Nb compound are preliminarily dissolved (hereinafter may be referred to as the solution (C)). The pH of the solution (C) is preferably 5 or lower and more preferably 2 or lower. By adjusting the pH of the solution (C) to 5 or lower, hydrolysis does not occur before mixing with an alkaline solution, and the gelation of the solvent (C) can be prevented.

When pH adjustment is necessary in the preparations of the acid solution (A) and (B), and the solution (C), pH adjustment can be carried out by using an inorganic acid such as sulfuric acid or hydrochloric acid, or an organic acid such as acetic acid.

Also, a Ti compound and a Nb compound contained in the solution (C) can be the same as the Ti and Nb compounds contained in the respective acid solutions (A) and (B). As a solvent for the solution (C), a suitable solvent such as pure water, ethanol and acid can be used. The molar ratio (Nb/Ti) of Nb/Ti contained in the solution (C) is preferably within the range of 1≤Nb/Ti≤28 and more preferably within the range of 1.3<Nb/Ti≤2.4.

The molar ratio of Nb/Ti in a solution can be different from the ratio in the active material obtained as the final production. This is because the production amount and production rate of the coprecipitated product at the time of addition of a pH adjusting agent vary according to the types of a Ti element-containing starting material and a Nb element-containing starting material. When the molar ratio of Nb/Ti in a solution is different from the ratio in the active material obtained as the final production, the molar ratio of Nb/Ti in a solution needs to be adjusted such that the ratio in the final production becomes a desired value within the range of 1≤Nb/Ti≤28.

The molar concentrations of Ti and Nb in the solution (C) are not particularly limited, but the molar concentration of Ti is preferably within the range of 0.01 to 10 mol/L and more preferably within the range of 0.1 to 5.0 mol/L. Also, the molar concentration of Nb is preferably within the range of 0.01 to 10 mol/L and more preferably within the range of 0.1 to 5.0 mol/L.

When the molar concentrations of Ti and Nb in the solution (C) are not less than the aforementioned lower limits, the molar concentrations of Ti and Nb are not too low, and consequently, the precipitation amount of the coprecipitated product are sufficiently. Furthermore, productivity is improved. Also, when the molar concentrations of Ti and Nb in the solution (C) are not more than the aforementioned upper limits, the molar concentrations of Ti and Nb are not too high, and consequently, hydrolysis is hardly to occur. Furthermore, it is possible to stably produce the coprecipitated product, and the quality of a battery active material is improved.

<Measurement Method of Molar Ratio>

Also, the molar ratio of Nb/Ti can be calculated by measuring the concentrations of Ti and Nb elements contained in a sample using inductively coupled plasma (ICP) emission spectroscopy.

A solution and powder of active materials can be measured after being subjected to a generally known pretreatment method, but the active material contained in a battery as an electrode material can be measured as follows. Firstly, an active material-containing layer (for example, the active material layer described below) is detached from an electrode substrate such as a metal foil. For example, an active material layer can be detached by irradiating an ultrasonic wave to an electrode substrate in a solvent. Next, an active material layer is heated in the atmosphere for a short time (for example, for 1 hour at 500° C.). Other components such as a binder and a conductive agent are removed by heating. Meanwhile, the molar ratio of the elements constituting the active material does not change even after heating. The residue obtained after heating is dissolved in an acid so as to prepare a measurement sample. This measurement sample is subjected to ICP emission spectroscopy.

Then, the mixed solution containing Ti and Nb compounds, which was prepared in the above manner, is mixed with an alkaline solution of a pH adjusting agent, to thereby precipitate a coprecipitated product. A pH adjusting agent is preferably an alkaline solution, the pH of which is preferably 8 or higher and more preferably 12 or higher. The solution with the higher pH is preferred because a coprecipitated product can be precipitated with the smaller liquid amount thereof. As the pH adjusting agent, 35 wt % ammonia water is used, for example. Usable examples of the pH adjusting agent other than ammonia water include sodium hydroxide, potassium hydroxide and lime water. The reaction temperature is preferably within the range of 10° C. to 80° C., and also can be appropriately selected in terms of aggregation degree and particle shape of an obtained coprecipitated product.

In the mixing method, a pH adjusting agent can be added dropwise to the mixed solution containing Ti and Nb compounds, and inversely, the mixed solution containing Ti and Nb compounds can be added dropwise to a pH adjusting agent. The aggregation degree and particle shape of a precipitated product can be controlled by a method of dropwise addition of a liquid, an addition rate and timing. It is preferable to slowly and frequently add a small amount of a pH adjusting agent to the mixed solution from the view of suppressing excessive aggregation.

The pH of the mixed solution containing Ti and Nb is adjusted to an alkaline side by adding a pH adjusting agent. The pH adjustment can be carried out while monitoring the precipitation state of the coprecipitated product, and the pH is adjusted within the range of 1-10 and preferably within the range of 6-9 as a guide. Thereby, it is possible to precipitate the coprecipitated product containing Ti and Nb.

During the pH adjustment, the solution obtained by mixing a pH adjusting agent and the solutions (A), (B) and (C) should be prevented from being gelatinized. Specifically, the pH adjustment is carried out such that the room-temperature viscosity of the solution obtained by mixing a pH adjusting agent and the solution (A), (B) and (C) is maintained to 5000 cp or lower and more preferably 1000 cp or lower. Thereby, it is possible to suppress excessive aggregation and to synthesize microparticles.

Then, the obtained coprecipitated product is washed. As a solution used for this washing, pure water is preferred, for example. As a guide, washing is carried out until the pH of the waste solution subjected to the washing become close to the range of 6-8 and preferably neutrality. After the sufficient washing, filtration and drying are carried out, to thereby obtain precursor powders.

<pH Measurement Method>

The pH value in the present embodiment is the value measured by the glass electrode method. The glass electrode method is a method of determining a pH value on the basis of difference in electromotive forces between a glass electrode, which generates an electromotive force in proportion to pH of a solution, and a reference electrode. More specifically, the value measured on the basis of the pH measurement method standardized by JIS Z 8802:2011 is defined as the pH value when using the pH meter adapted to the provisions of JIS Z 8805: 2011, which is equipped with a general glass electrode to measure pH on the basis of membrane potential difference of a glass membrane and a reference electrode to be used in combination with this general glass electrode.

During the pH value measurement, the measurement is carried out using a thermostatic bath at 25±0.2° C. There is the possibility in which an accurate voltage measurement cannot be carried out when electrode surface is dirty. Thus, the measurement is preferably carried out with a new electrode which has not been immersed in any solution other than a sample solution. Also, during the measurement, it is necessary to prevent bubbles from attaching to electrode surface and to take care of the environment so as to eliminate static electricity effect. The procedures such as the sample preparation method for the measurement, the calibration solution and calibration method of a pH meter, and a measurement method are carried out in accordance with JIS Z 8802:2011.

The aforementioned pH value is the practically defined value, and reflects a physically meaningful value by measuring hydrogen ion concentration in aqueous systems. However, a pH value is ideally represented by pH=−log10 $[a_{H+}]$ ($a_{H+}$: activity of hydrogen ions), and is a value determined by activity of hydrogen ions which is difficult to be measured. Thus, the pH value measured in a nonaqueous solution does not have a physicochemical meaning. For example, a measured pH value can be 0 or less. However, the increase or decrease in the pH value can be considered to qualitatively indicate the increase or decrease in activity of hydrogen ions, and so the pH value measured even in a nonaqueous solution has the meaning as activity of hydrogen ions. For these reasons, the pH value measured in a nonaqueous solution is also defined as the value determined by the measuring method described above. In the case of measuring the pH value in a nonaqueous solution, devices that are suitable for measurement of a nonaqueous solution are used as measuring devices to be used.

The precursor obtained in this manner is the composite coprecipitated product in which Nb and Ti are mixed and more preferably the amorphous composite hydroxide. By preparing the amorphous precursor powders in which Ti and Nb are homogeneously mixed, the reactivity during burning can be enhanced, and the Nb—Ti composite oxide can be burned at lower temperature for a shorter time than a conventional solid phase reaction method, etc. Also, it is possible to suppress the temperature and time in the subsequent burning step.

The precursor powders subjected to filtration and drying can form aggregated powders. Also, the particle sizes of the primary particles can be random because of the influence of the types of raw materials. In that case, it is preferable to carry out pulverization by a mechanical pulverization method such as a ball mill or a bead mill.

Then, burning is carried out for the obtained precursor powders. This burning is carried out within the range of 635° C. to 1200° C. The burning time is set to the range of 30 seconds to 12 hours. The burning temperature is preferably within the range of 700° C. to 1100° C., more preferably within the range of 900° C. to 1100° C., and much more preferably within the range of 950° C. to 1100° C. The burning time is preferably within the range of 30 minutes to 12 hours and more preferably within the range of 1 to 5 hours. By carrying out the burning under these conditions, it is possible to form the phase composed of the niobium-titanium composite oxide.

Regarding the burning temperature, the measured temperature can deviate from the actual temperature of the powders according to the position of a thermocouple to measure temperature of inside of a production apparatus used for the burning. Thus, depending on the size of a production apparatus, it is possible to obtain the powder having the same crystallinity as the present embodiment even at a temperature less than 635° C.

In order to more precisely define a measured temperature, it is preferable that the thermal analysis be carried out using a TG-DTA (differential thermal-thermogravimetric simultaneous measurement) device, to thereby accurately determine a reaction starting temperature. As a result of implementing the TG-DTA, it was found that the starting point of the exothermic peak, which is attributed to the production of the Nb—Ti composite oxide, appeared at 635° C. on the DTA curve. The DTA curve shows that the Nb—Ti composite oxide can be obtained at the temperature region equal to or higher than 635° C.

Figure 14:
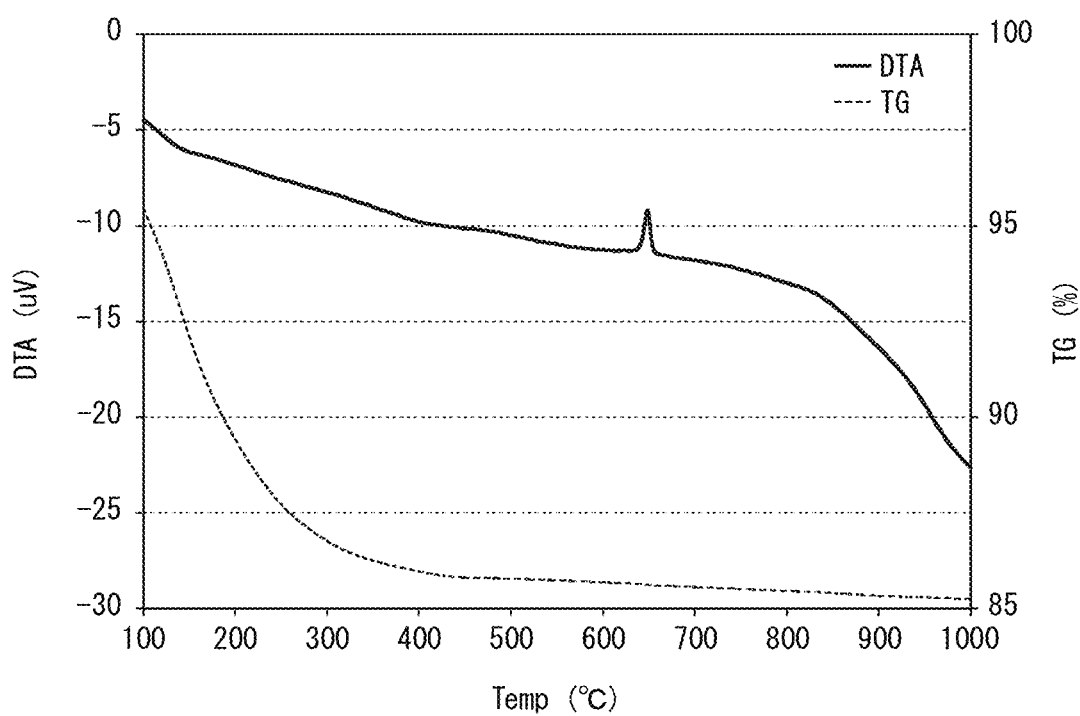
FIG. 14 is the graph showing the result of TG-DTA measurement for the niobium-titan composite oxide.

FIG. 14 shows the TG-DTA measurement results obtained by the thermal analysis using the TG-DTA (differential thermal-thermogravimetric simultaneous measurement) device. As shown in FIG. 14, the starting point of the exothermic peak attributed to the production of the Nb—Ti composite oxide appears at 635° C. on the DTA curve.

TG-DTA analysis is carried out under the following conditions, for example.

Measurement device: Seiko Instruments Inc. TG/DTA6300

Temperature scanning rate: 3° C./min

Measurement temperature range: 25° C. to 1000° C.

Sample cell: alumina

Gas: air

Gas flow rate: 200 mL/min

Also, when the burning temperature is 800° C. or higher, the grain growth and necking among particles progress. In order that the crystallinity is improved while suppressing the grain growth and necking among particles, the annealing step, in which the annealing temperature is within the range of 600° C. to 800° C. and the annealing time is 1 to 24 hours, can be provided before and after the aforementioned burning step.

The atmosphere for the burning can be an air atmosphere, a vacuum atmosphere or an inert gas atmosphere such as nitrogen, argon or helium, but an oxidizing atmosphere is preferred to obtain an oxide, and specifically an air atmosphere is preferred. Also, the burning can be carried out in an air atmosphere wherein an oxygen concentration is intentionally increased.

In the powders subjected to the burning, the particles could be necked, and the particles were excessively grown. In that case, it is preferable to carry out pulverization by a mechanical pulverization method such as a ball mill or a bead mill because the finer microparticles can be formed. However, the crystallinity of the active material can be deteriorated when carrying out the machinery pulverization. This unfavorable phenomenon can be remedied by providing again the annealing step, in which the annealing temperature is within the range of 600° C. to 800° C. and the annealing time is 1 to 24 hours, after the aforementioned step.

Also, the powders subjected to the burning can be further compounded with carbon. The compounding method with carbon is not particularly limited. Examples of a carbon source include saccharides, polyolefins, nitriles, alcohols and benzene ring-containing organic compounds. Also, the powders can be supported by carbon black or graphite through a mechanical method such as a planetary ball mill. The powder subjected to the burning and a carbon source are mixed, and then burned in a reducing atmosphere. The burning temperature is preferably 900° C. or lower. When the burning temperature exceeds 900° C., the reduction reaction of a Nb element can progress, and a heterophase such as $NbO_2$ can be precipitated. Appropriate examples of a reducing atmosphere include atmospheres such as nitrogen, carbon dioxide and argon.

Also, when the particle size of the powders subjected to the burning is 1 μm or less, it is preferable to carry out granulation through a method such as spray drying because the dispersibility of a slurry in an electrode production step process is improved and the coating fluidity thereof is stabilized.

In the battery active material obtained by the production method of the present embodiment, the average particle size of primary particles is 2 μm of less, more preferably 1 μm or less, and much more preferably 0.5 μm or less, and is much smaller than the particle size of the battery active material obtained by a solid phase reaction method or a sol-gel method.

By using the method described above, it is possible to obtain a battery active material according to the present embodiment.

[Second Embodiment]

Next, a nonaqueous electrolyte battery according to a second embodiment will be described.

The nonaqueous electrolyte battery according to the embodiment includes at least a positive electrode, the negative electrode containing the battery active material obtained by the production method according to the first embodiment, and a nonaqueous electrolyte. More specifically, the nonaqueous electrolyte battery according to the embodiment includes an external material, a positive electrode that is accommodated inside the external material, a negative electrode that is spatially separated from the positive electrode inside the external material, is accommodated with, for example, a separator interposed therebetween, and includes the foregoing battery active material, and a nonaqueous electrolyte with which the inside of the external material is filled.

Figure 3:
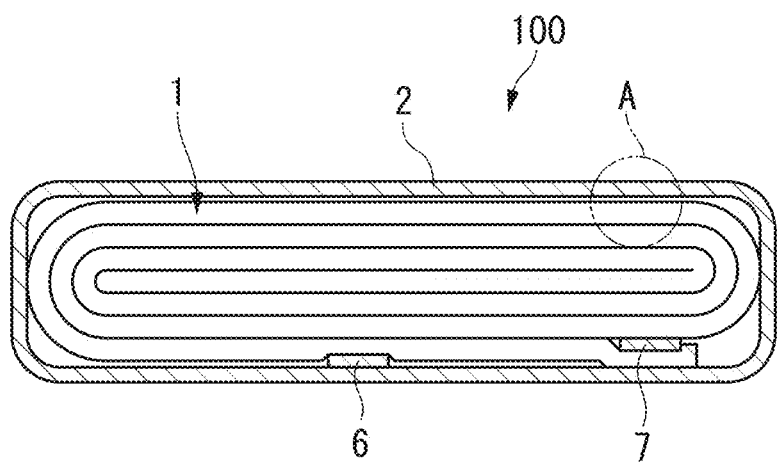
FIG. 3 is a schematic sectional view illustrating an example of a flat type nonaqueous electrolyte battery according to a second embodiment.
Figure 4:
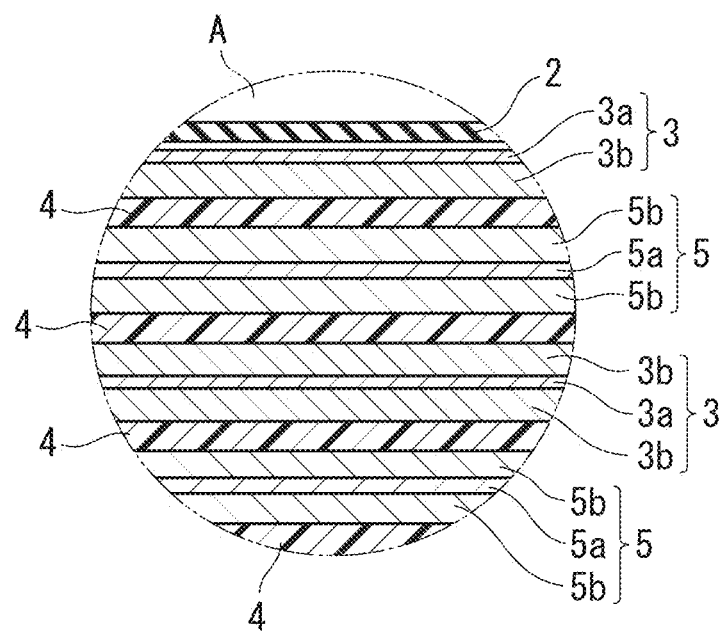
FIG. 4 is a schematic enlarged sectional view illustrating a part A of FIG. 3.

Hereinafter, a flat type nonaqueous electrolyte battery (nonaqueous electrolyte battery) 100 illustrated in FIGS. 3 and 4 will be described as an example of the nonaqueous electrolyte battery according to the embodiment. FIG. 3 is a schematic sectional view illustrating the cross-section of the flat type nonaqueous electrolyte battery 100. FIG. 4 is an enlarged sectional view illustrating a part A illustrated in FIG. 3. These drawings are schematic diagrams for describing the nonaqueous electrolyte battery according to the embodiment. The shapes, dimensions, ratios, and the like are different from those of actual device in some portions, but design of the shape, dimensions, ratios, and the like can be appropriately modified in consideration of the following description and known technologies.

The flat type nonaqueous electrolyte battery 100 illustrated in FIG. 3 is configured such that a winding electrode group 1 with a flat shape is accommodated inside an exterior material 2. The exterior material 2 may be made by forming a laminated film in a bag-like shape or may be a metal container. The winding electrode group 1 with the flat shape is formed by spirally winding a laminate laminated from the outside, i.e., the side of the exterior material 2, in the order of a negative electrode 3, a separator 4, a positive electrode 5, and the separator 4 and performing press-molding. As illustrated in FIG. 4, the negative electrode 3 located at the outermost periphery has a configuration in which a negative electrode layer 3b is formed on one side of the inner surface of a negative electrode collector 3a. The negative electrodes 3 of portions other than the outermost periphery have a configuration in which the negative electrode layers 3b are formed on both surfaces of the negative electrode collector 3a. In the flat type nonaqueous electrolyte battery 100 according to the embodiment, the negative electrode active material in the negative electrode layer 3b is configured to include the battery active material according to the first embodiment. The positive electrode 5 has a configuration in which positive electrode layers 5b are formed on both surfaces of a positive electrode collector 5a. A gel-like nonaqueous electrolyte to be described below may be used instead of the separator 4.

In the winding electrode group 1 illustrated in FIG. 3, in the vicinity of the outer peripheral end thereof, a negative electrode terminal 6 is electrically connected to the negative electrode collector 3a of the negative electrode 3 of the outermost periphery. A positive electrode terminal 7 is electrically connected to the positive electrode collector 5a of the inside positive electrode 5, as illustrated in FIG. 4. The negative electrode terminal 6 and the positive electrode terminal 7 extend toward the outer portion of the exterior material 2 with the bag-like shape and are connected to extraction electrodes included in the exterior material 2.

When the nonaqueous electrolyte battery 100 including an exterior material formed of the laminated film is manufactured, the exterior material 2 with the bag-like shape having an opening is charged with the winding electrode group 1 to which the negative electrode terminal 6 and the positive electrode terminal 7 are connected, the liquid nonaqueous electrolyte is injected from the opening of the exterior material 2, and the opening of the exterior material 2 with the bag-like shape is subjected to heat-sealing with the negative electrode terminal 6 and the positive electrode terminal 7 interposed therebetween, so that the winding electrode group 1 and the liquid nonaqueous electrolyte are completely sealed.

When the nonaqueous electrolyte battery 100 having an exterior material formed of a metal container is manufactured, the metal container having an opening is charged with the winding electrode group 1 to which the negative electrode terminal 6 and the positive electrode terminal 7 are connected, the liquid nonaqueous electrolyte is injected from the opening of the exterior material 2, and the opening is sealed by mounting a cover member on the metal container.

For the negative electrode terminal 6, for example, a material having electric stability and conductivity within the range of a potential equal to or nobler than 1 V and equal to or lower than 3 V with respect to lithium can be used. Specifically, examples of this material include aluminum and an aluminum alloy containing an element such as Mg, Ti, Zn, Mn, Fe, Cu, or Si. The negative electrode terminal 6 may be more preferably formed of the same material as the negative electrode collector 3a in order to reduce contact resistance with the negative electrode collector 3a.

For the positive electrode terminal 7, a material having electric stability and conductivity within the range of a potential from 3 V to 4.25 V with respect to lithium can be used. Specifically, examples of this material include aluminum and an aluminum alloy containing an element such as Mg, Ti, Zn, Mn, Fe, Cu, or Si. The positive electrode terminal 7 may be more preferably formed of the same material as the positive electrode collector 5a in order to reduce contact resistance with the positive electrode collector 5a.

Hereinafter, the exterior material 2, the negative electrode 3, the positive electrode 5, the separator 4, and the nonaqueous electrolyte which are constituent members of the nonaqueous electrolyte battery 100 will be described in detail.

(1) Exterior Material

The exterior material 2 is formed of a laminated film with a thickness equal to or less than 0.5 mm, or a metal container with a thickness equal to or less than 1.0 mm is used.

The shape of the exterior material 2 can be appropriately selected from a flat type (thin type), a square type, a cylindrical type, a coin type, and a button type.

Examples of the exterior material 2 include an exterior material for a small-sized battery mounted on a portable electronic apparatus and an exterior material for a large-sized battery mounted on a two-wheeled or four-wheeled vehicle or the like according to the dimensions of the battery.

When the exterior material 2 formed of a laminated film is used, a multi-layer film in which a metal layer is interposed between resin layers is used. In this case, in the metal layer, it is preferable to utilize an aluminum foil or an aluminum alloy foil for weight reduction. For example, a polymer material such as polypropylene (PP), polyethylene (PE), nylon, or polyethylene terephthalate (PET) can be used as the resin layer. The laminated film can be molded in the shape of the exterior material by performing sealing by heat sealing.

When the exterior material 2 formed of a metal container s used, the metal container formed of aluminum, an aluminum alloy, or the like is used. As such an aluminum alloy, an alloy containing an element such as magnesium, zinc, or silicon is preferably used. When transition metal such as iron, copper, nickel, or chromium is contained in the aluminum alloy, it is preferable to suppress an amount of the transition metal to 100 or less mass ppm. When the exterior material 2 formed of a metal container is used, it is more preferable to use the metal container with a thickness equal to or less than 0.5 mm.

(2) Negative Electrode

The negative electrode 3 includes the negative electrode collector 3a and the negative electrode layer 3b that is formed on one side or both sides of the negative electrode collector 3a and includes a negative electrode active material, a conducting agent, and a binding agent.

The battery active material according to the above-described first embodiment is used as the negative electrode active material.

The nonaqueous electrolyte battery 100 into which the negative electrode 3 including the negative electrode layer 3b containing the negative electrode active material is embedded has large current characteristics and excellent charging and discharging cycle performance.

The negative electrode active material is the electrode active material containing the niobium-titanium composite oxide described in the first embodiment. This electrode active material has the crystal structure of the monoclinic niobium-titanium composite oxide, and contains secondary particles formed by aggregation of primary particles. The average particle size of primary particles is 2 μm or less, more preferably 1 μm or less, and much 1 more preferably 0.5 μm or less, and is much smaller than the particle size of the battery active material obtained by a solid phase reaction method or a sol-gel method.

Also, as the negative electrode active material, the negative electrode active material according to the first embodiment can be used alone, but can be used in combination with other negative electrode active materials. Usable examples of other negative active materials include anatase type titanium dioxide $TiO_2$, β type titanium dioxide, a ramsdellite type lithium titanate $Li_2Ti_3O_7$, spinel-type lithium titanate $Li_4Ti_5O_{12}$, niobium oxide and the niobium-containing composite oxide. These oxide compounds can be preferably used because the specific gravities thereof are close to those of the compounds contained in the active material according to the first embodiment, and these are easily mixed and dispersed.

The conducting agent improves the power collection performance of the negative electrode active material and suppresses contact resistance between the negative electrode active material and the negative electrode collector 3a. Examples of the conducting agent include agents containing acetylene black, carbon black, coke, a carbon fiber, and graphite.

The binding agent fills gaps between the dispersed negative electrode active material to bind the negative active material and the conducting agent and bind the negative electrode active material and the negative electrode collector 3a. Examples of the binding agent include agents containing polytetrafluoroethylene (PTFE), polyvinylidene fluoride (PVdF), fluorine-based rubber, styrene-butadiene rubber (SBR), an ethylene-propylene-diene copolymer (EPDM), and carboxymethyl cellulose (CMC).

In the negative electrode layer 3b, the negative electrode active material, the conducting agent, and the binding agent are preferably mixed at ratios of 68% by mass or more and 96% by mass or less, 2% by mass or more and 30% by mass or less, and 2% by mass or more and 30% by mass or less, respectively. The negative electrode active material, the conducting agent, and the binding agent are more preferably mixed at ratios of 70% by mass or more and 96% by mass or less, 2% by mass or more and 28% by mass or less, and 2% by mass or more and 28% by mass or less, respectively.

By setting the amount of the conducting agent to be 2% by mass or more, the power collection performance of the negative layer 3b can be improved and the large current characteristics of the nonaqueous electrolyte battery 100 can be improved. Also, by setting the amount of binding agent to be 2% by mass or more, the binding property of the negative electrode layer 3b and the negative electrode collector 3a can be improved and the cycle characteristics can be improved. On the other hand, in terms of large capacity, it is preferable to set the conducting agent and the binding agent to be 30% by mass or less and it is more preferable to set the conducting agent and the binding agent to be 28% by mass or less.

The negative electrode collector 3a is preferably an aluminum foil which is electrochemically stable within a potential range of nobler than 1 V (specifically the range of a potential equal to or nobler than 1 V and equal to or lower than 3 V with respect to lithium) or an aluminum alloy foil containing an element such as Mg, Ti, Zn, Mn, Fe, Cu, or Si. The thickness of the negative electrode collector 3a is preferably within the range of 8 μm to 25 μm and is more preferably within the range of 5 μm to 20 μm. In addition to the above foil, a stainless foil, a titanium foil, a copper foil, a nickel foil, or the like can be used as the negative electrode collector 3a. For example, when a negative electrode potential is nobler than 0.3 V with respect to metal lithium or a lithium-titanium oxide is used as the negative electrode active material, it is preferable to use the foregoing aluminum foil or aluminum alloy foil since the battery weight can be suppressed.

When the foregoing aluminum foil is used as the negative electrode collector 3a, the purity of the aluminum foil is preferably 99% or more. When the foregoing aluminum alloy foil is used as the negative electrode collector 3a, it is preferable to suppress a content of a transition metal such as Fe or Cu to 1% by mass or less.

The negative electrode 3 can be produced, for example, by suspending the negative electrode active material, the conducting agent, and the binding agent in a general solvent to prepare a slurry, applying the slurry to the negative electrode collector 3a and performing drying, and then performing pressing. The negative electrode 3 may be produced by forming the negative electrode active material, the conducting agent, and the binding agent in a pellet form to make the negative electrode layer 3b, and disposing and forming the negative electrode layer 3b on the negative electrode collector 3a.

(3) Positive Electrode

The positive electrode 5 includes the positive electrode collector 5a and the positive electrode layer 5b that is formed on one side or both sides of the positive electrode collector 5a and includes a positive electrode active material, a conducting agent, and a binding agent. For example, an oxide, a sulfide, or a polymer can be used as the positive electrode active material.

As the oxide used for the positive electrode active material, for example, manganese dioxide ($MnO_2$) in which lithium is occluded, an iron oxide, a copper oxide, a nickel oxide, a lithium-manganese composite oxide (for example, $Li_xMn_2O_4$ or $Li_xMnO_2$), a lithium-nickel composite oxide (for example, $Li_xNiO_2$), a lithium-cobalt composite oxide ($Li_xCoO_2$), a lithium-nickel-cobalt composite oxide (for example, $LiNi_{1-y}Co_yO_2$), a lithium-manganese-cobalt composite oxide (for example, $Li_xMn_yCo_{1-y}O_2$), a lithium-manganese-nickel composite oxide ($Li_xMn_{2-y}Ni_yO_4$) having a spinel structure, a lithium-phosphorus oxide (for example, $Li_xFePO_4$, $Li_xFe_{1-y}Mn_yPO_4$, or $Li_xCoPO_4$) having an olivine structure, iron sulfate ($Fe_2(SO_4)_3$), or a vanadium oxide (for example, $V_2O_5$) can be used. In each of the foregoing chemical formulae, x and y preferably satisfy the relational expressions of "0<x≤1" and "0≤y≤1," respectively.

As a polymer used for the positive electrode active material, for example, a conductive polymer material such as polyaniline or polypyrrole or a disulfide-based polymer material can be used. An inorganic material or an organic material such as sulfur (S) or carbon sulfide can also be used as the positive electrode active material.

Of the above examples, examples of the preferable positive electrode active materials include a lithium-manganese composite oxide ($Li_xMn_2O_4$), a lithium-nickel composite oxide ($LiNiO_2$), a lithium-cobalt composite oxide ($Li_xCoO_2$), a lithium-nickel-cobalt composite oxide ($LiNi_{1-y}Co_yO_2$), a lithium-manganese-nickel composite oxide ($Li_xMn_{2-y}Ni_yO_4$) having a spinel structure, a lithium-manganese-cobalt composite oxide ($Li_xMn_yCo_{1-y}O_2$), and a lithium iron phosphate ($Li_xFePO_4$) with a high positive electrode voltage. In each of the foregoing chemical formulae, x and y preferably satisfy the relational expressions of "0<x<1" and "0≤y≤1, " respectively.

Examples of the more preferable positive electrode active materials include a lithium-cobalt composite oxide and a lithium-manganese composite oxide. Since such a positive electrode active material has high ion conductivity, diffusion of lithium ions in the positive electrode active material rarely enters a rate-controlling step in combination of the above-described negative electrode active material. Therefore, the positive electrode active material including the foregoing composition has excellent compatibility with a lithium-titanium composite oxide in the negative electrode active material.

When an ambient temperature molten salt is used as the nonaqueous electrolyte, it is preferable to use a lithium iron phosphate, $Li_xVPO_4F$, a lithium-manganese composite oxide, a lithium-nickel composite oxide, or a lithium-nickel-cobalt composite oxide in terms of a cycle lifespan. This is because reactivity between the positive electrode active material and the ambient temperature molten salt is small.

The conducting agent improves the power collection performance of the positive electrode active material and suppresses contact resistance between the positive electrode active material and the positive electrode collector 5a. Examples of the conducting agent include agents containing acetylene black, carbon black, artificial graphite, natural graphite, and a conductive polymer.

The binding agent fills gaps between the dispersed positive electrode active material to bind the positive active material and the conducting agent and bind the positive electrode active material and the positive electrode collector 5a. Examples of the binding agent include agents containing polytetrafluoroethylene (PTFE), polyvinylidene fluoride (PVdF), and fluorine-based rubber. As the binding agent, modified PVdF substituted with at least another substituent, a copolymer of vinylidene fluoride and propylene hexafluoride, and a terpolymer of polyvinylidene fluoride, tetrafluoroethylene, and propylene hexafluoride can be used in association with the above materials.

For example, N-methyl-2-pyrrolidone (NMP) or dimethylformamide (DMF) can be used as an organic solvent dispersing the binding agent.

In the positive electrode layer 5b, the positive electrode active material and the binding agent are preferably mixed at ratios of 80% by mass or more and 98% by mass or less, and 2% by mass or n OTC and 20% by mass, or less respectively. By setting the amount of binding agent to be 2% by mass or more, sufficient electrode intensity can be obtained. By setting the amount of binding agent included in the positive electrode layer 5b to be 20% by mass or less, it is possible to reduce a mixture amount of insulator of the electrode and reduce internal resistance.

When the conducting agent is added to the positive electrode layer 5b, the positive electrode active material, the conducting agent, and the binding agent are mixed at ratios of 77% by mass or more and 95% by mass or less, 2% by mass or more and 20% by mass or less, and 3% by mass or more and 15% by mass or less, respectively, and are more preferably mixed at ratios of 80% by mass or more and 95% by mass or less, 3% by mass or more and 18% by mass or less, and 2% by mass or more and 17% by mass or less, respectively.

By setting a content of the conducting agent to be 2% by mass or more and preferably 3% by mass or more, it is possible to obtain the above-described advantages. By setting the content of the conducting agent to be 20% by mass or less and preferably 18% by mass or less, it is possible to reduce decomposition of the nonaqueous electrolyte on the conductive agent surface in high temperature preservation.

The positive electrode collector 5a is preferably, for example, an aluminum foil or an aluminum alloy foil containing an element such as Mg, Ti, Zn, Mn, Fe, Cu, or Si. A stainless foil, a titanium foil, or the like can also be used as the positive electrode collector 5a. The thickness of the positive electrode collector 5a is preferably within the range of 8 μm to 25 μm.

When the foregoing aluminum foil is used as the positive electrode collector 5a, the purity of the aluminum foil is preferably 99% or more. When the foregoing aluminum alloy foil is used as the positive electrode collector 5a, it is preferable to suppress a content of a transition metal such as Fe or Cu to 1% by mass or less.

The positive electrode 5 can be produced, for example, by suspending the positive electrode active material, the conducting agent, and the binding agent in a general solvent to prepare a slurry, applying the slurry to the positive electrode collector 5a and performing drying, and then performing pressing. The positive electrode 5 may be produced by forming the positive electrode active material, the conducting agent, and the binding agent in a pellet form to make the positive electrode layer 5b, and disposing and forming the positive electrode layer 5b on the positive electrode collector 5a.

(4) Nonaqueous Electrolyte

For example, a liquid nonaqueous electrolyte prepared by dissolving a solute in an organic solvent or a gel-like nonaqueous electrolyte in which a liquid electrolyte and a polymer material are composited can be used as the nonaqueous electrolyte.

As the liquid nonaqueous electrolyte, it is desirable to use an electrolyte obtained by dissolving a solute in an organic solvent at a density equal to or greater than 0.5 mol/L and equal to or less than 2.5 mol/L.

One or more kinds of lithium salts selected from lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bistrifluoromethylsulfonimide [$LiN(CF_3SO_2)_2$], [$LiN(C_2F_5SO_2)_2$], [$Li(CF_3SO_2)_3C$], and $LiB[(OCO)_2]_2$ is preferable as an example of the solute. The lithium salt is dissolved in an organic solvent at a density within the range of 0.5 mol/L to 2 mol/L to make an organic electrolytic solution. A solute which is rarely oxidized at a high potential is preferably used and $LiPF_6$ is most preferably used.

Examples of the organic solvent include cyclic carbonates such as propylene carbonate (PC), ethylene carbonate (EC), or vinylene carbonate, chain carbonates such as diethyl carbonate (DEC), dimethyl carbonate (DMC), and methylethyl carbonate (MEC), cyclic ethers such as tetrahydrofuran (THF), 2-methyltetrahydrofuran (2MeTHF), and dioxolane (DOX), chain ethers such as dimethoxyethane (DME) and diethoxyethane (DEE), and γ-butyrolactone (GBL), acetonitrile (AN), and sulfolane (SL). Such organic solvents can be used solely or in a mixed solvent form.

Of the above examples, a mixed solvent in which at least two solvents are mixed from the group of propylene carbonate (PC), ethylene carbonate (EC), and diethyl carbonate (DEC) or a mixed solvent containing γ-butyrolactone (GBL) can be used as a preferable organic solvent. By using such a mixed solvent, it is possible to obtain a nonaqueous electrolyte battery having excellent high-temperature characteristics.

Examples of the polymer material forming the nonaqueous electrolyte include materials containing polyvinylidene fluoride (PVdF), polyacrylonitrile (PAN), and polyethylene oxide (PEO).

An ambient temperature molten salt (ionic melt) containing lithium ions can also be used as the nonaqueous electrolyte. For example, when an electrolyte Which is an ionic melt formed of lithium ions, organic cations and anions and is a liquid at a temperature equal to or less than 100° C. and preferably at a temperature equal to or less than room temperature is selected as the nonaqueous electrolyte, it is possible to obtain the nonaqueous electrolyte battery with a broad range of operation temperatures.

(5) Separator

As the separator 4, for example, a porous film containing polyethylene, polypropylene, cellulose, or polyvinylidene fluoride (PVdF) or a nonwoven fabric made of a synthetic resin can be used. As the porous film appropriately used for the separator 4, a film made of polyethylene, polypropylene, or both thereof can be used. The separator 4 formed of such a material is preferable since, when a battery temperature increases and reaches a given temperature, the separator 4 is melted, so that a shutdown function of blocking pores and considerably attenuating a charging and discharging current is easily added and stability of the nonaqueous electrolyte battery can be improved. In terms of reducing cost, the separator 4 formed of a cellulose-based material may be used.

Figure 5:
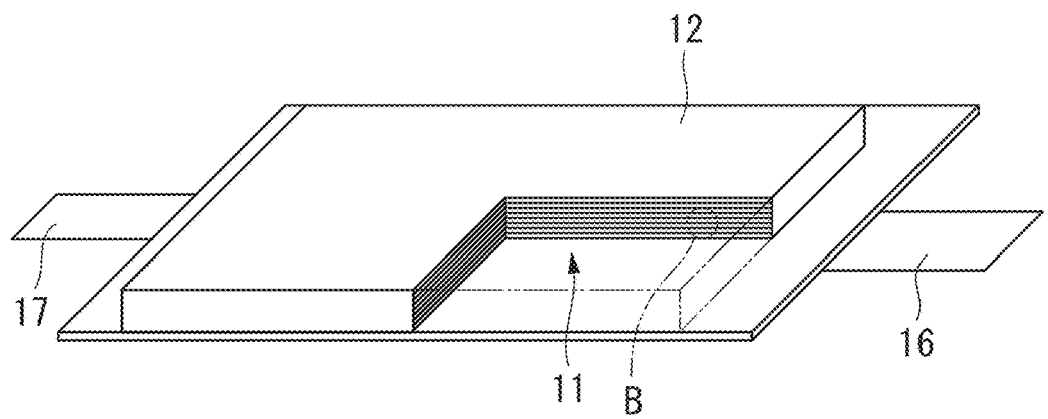
FIG. 5 is a partial cutout perspective view schematically illustrating another example of the flat type nonaqueous electrolyte battery according to the second embodiment.
Figure 6:
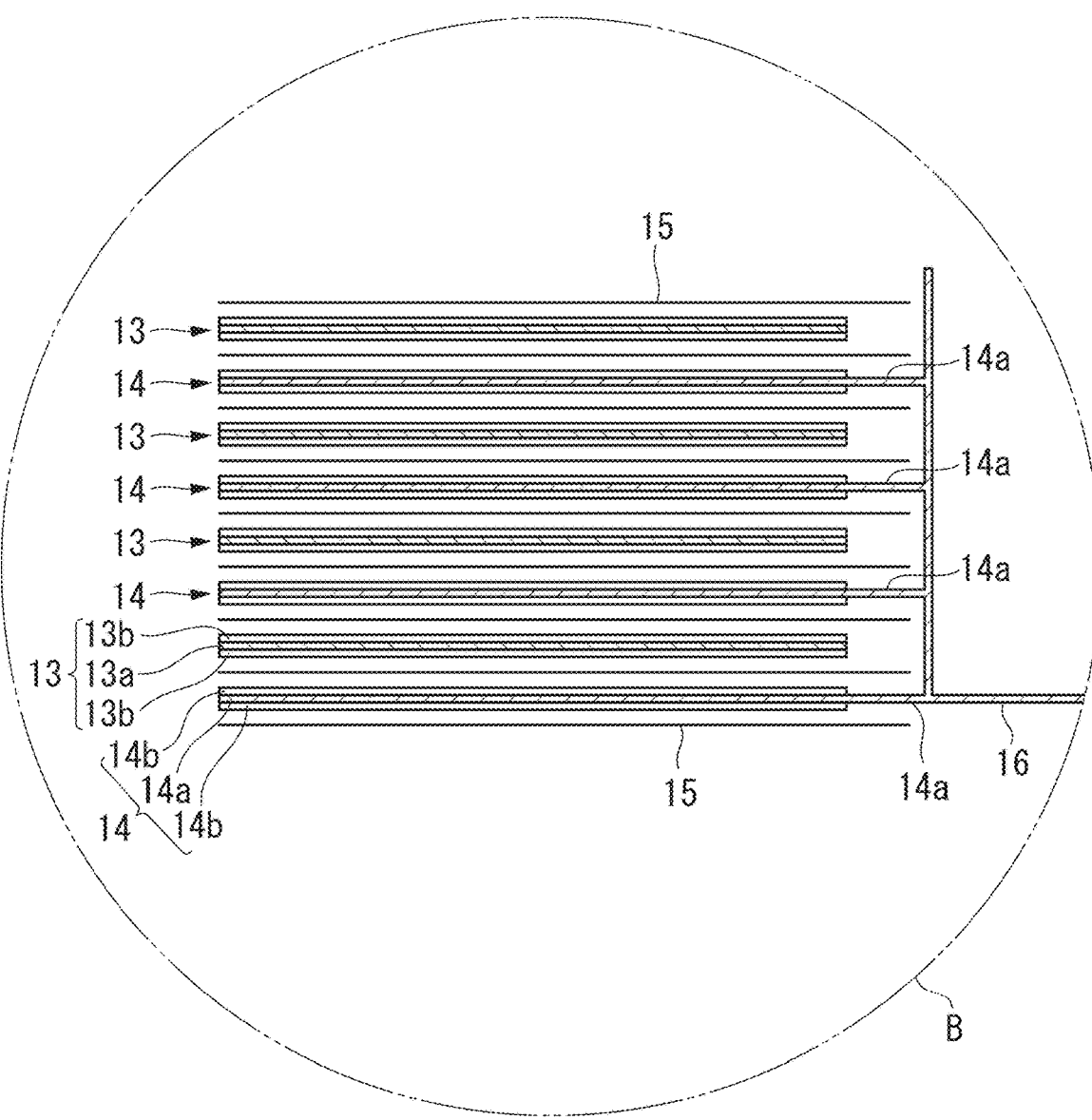
FIG. 6 is an enlarged schematic sectional view illustrating a part B of FIG. 5.

The configuration of the nonaqueous electrolyte battery according to the second embodiment is not limited to the above-described configuration illustrated in FIGS. 3 and 4. For example, a battery having a configuration illustrated in FIGS. 5 and 6 may be used. FIG. 5 is a partial cutout perspective view schematically illustrating another flat type nonaqueous electrolyte secondary battery according to the second embodiment. FIG. 6 is an enlarged schematic sectional view illustrating a part B of FIG. 5.

The nonaqueous electrolyte battery illustrated in FIGS. 5 and 6 is configured such that a lamination type electrode group 11 is accommodated inside an exterior member 12. As illustrated in FIG. 6, the lamination type electrode group 11 has a structure in which positive electrodes 13 and negative electrodes 14 are alternately laminated with separators 15 interposed therebetween.

As illustrated in FIG. 6, the plurality of positive electrodes 13 are present and each include a positive electrode collector 13a and positive electrode layers 13b supported on both surfaces of the positive electrode collector 13a. The positive electrode layer 13b contains a positive electrode active material.

As illustrated in FIG. 6, as in the positive electrodes 13, the plurality of negative electrodes 14 are present and each includes a negative electrode collector 14a and negative electrode layers 14b supported on both surfaces of the negative electrode collector 14a. The negative electrode layer 14b contains the negative electrode active material. The negative electrode active material contains the battery active material according to the first embodiment. One side of the negative electrode collector 14a of each negative electrode 14 protrudes from the negative electrode 14. The protruding negative electrode collector 14a is electrically connected to a strip-shaped negative electrode terminal 16. The front end of the strip-shaped negative electrode terminal 16 is drawn from the exterior member 12 to the outside. Although not illustrated, the side of the positive electrode collector 13a of the positive electrode 13 located opposite to the protruding side of the negative electrode collector 14a protrudes from the positive electrode 13. The positive electrode collector 13a protruding from the positive electrode 13 is electrically connected to a strip-shaped positive electrode terminal 17.

The front end of the strip-shaped positive electrode terminal 17 is located on an opposite side to the negative electrode terminal 16 and is drawn from a side of the exterior member 12 to the outside.

The material, a mixture ratio, dimensions, and the like of each member included in the nonaqueous electrolyte battery illustrated in FIGS. 5 and 6 are configured to be the same as those of each constituent member of the nonaqueous electrolyte battery 100 described in FIGS. 3 and 4.

In the above-described embodiment, it is possible to provide the nonaqueous electrolyte battery having excellent charging and discharging cycle performance.

(Third Embodiment)

Next, a battery pack according to a third embodiment will be described in detail.

The battery pack according to the embodiment includes at least one nonaqueous electrolyte battery (that is, a single battery) according to the foregoing second embodiment. When the plurality of single batteries are included in the battery pack, the single batteries are electrically connected in series, in parallel, or in series and parallel to be disposed.

Figure 7:
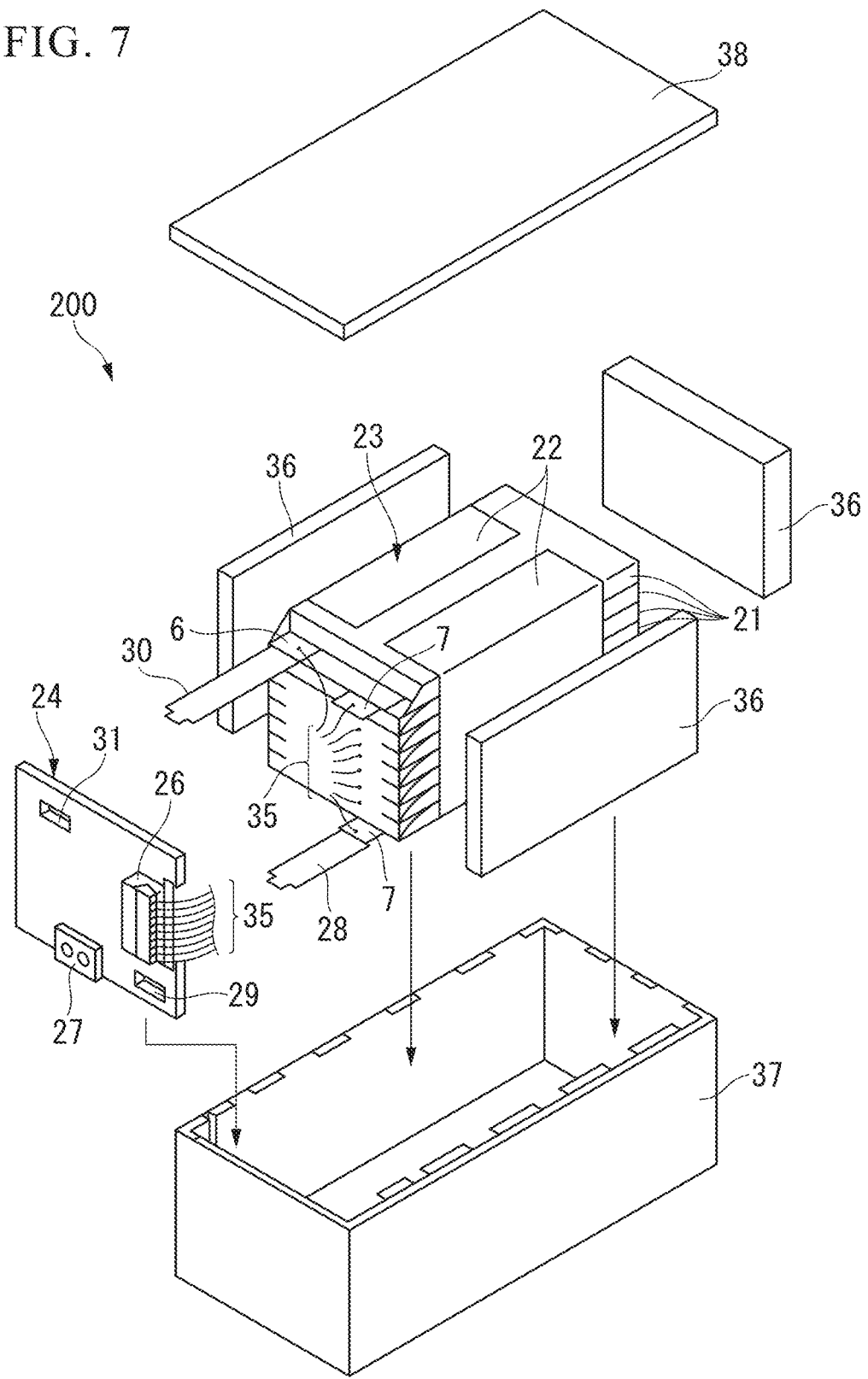
FIG. 7 is an exploded perspective view illustrating a battery pack according to a third embodiment.
Figure 8:
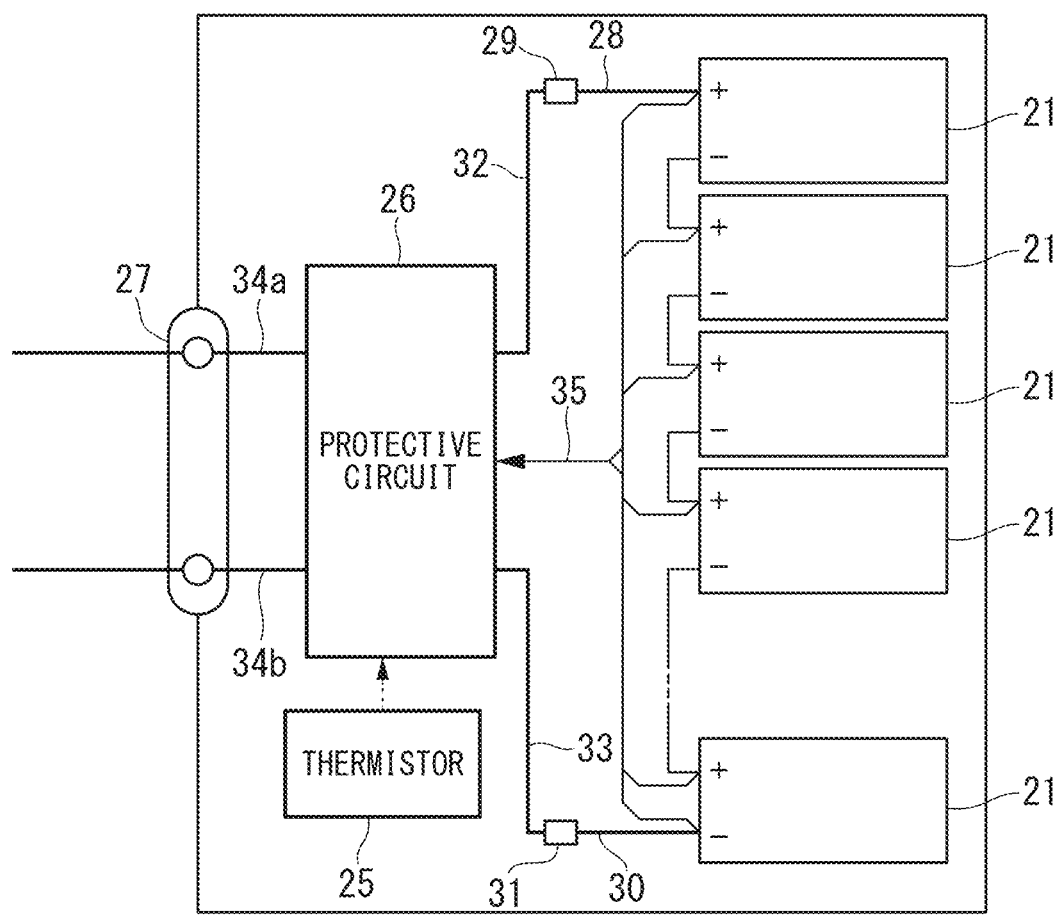
FIG. 8 is a block diagram illustrating an electric circuit included in the battery pack of FIG. 7.

Referring to FIGS. 7 and 8, a battery pack 200 according to the embodiment will be described specifically. In the battery pack 200 illustrated in FIG. 7, the flat type nonaqueous electrolyte battery 100 illustrated in FIG. 3 is used as a single battery 21.

The plurality of single batteries 21 are laminated so that the negative electrode terminals 6 and the positive electrode terminals 7 extending to the outside are arranged in the same direction, and thus assembled batteries 23 are configured by fastening using an adhesive tape 22. The single batteries 21 are mutually connected electrically in series, as illustrated in FIGS. 7 and 8.

A printed wiring board 24 is disposed to face the side surfaces of the single batteries 21 in which the negative electrode terminals 6 and the positive electrode terminals 7 extend. As illustrated in FIG. 7, a thermistor 25 (see FIG. 8), a protective circuit 26, and an electrifying terminal 27 to an external device are mounted on the printed wiring board 24. An insulation plate (not illustrated) is mounted on the surface of the printed wiring board 24 facing the assembled batteries 23 in order to avoid unnecessary connection with wirings of the assembled batteries 23.

A positive-side lead 28 is connected to the positive electrode terminal 7 located in the lowermost layer of the assembled batteries 23 and the front end of the positive electrode-side lead 28 is inserted into a positive electrode-side connector 29 of the printed wiring board 24 to be electrically connected. A negative electrode-side lead 30 is connected to the negative electrode terminal 6 located in the uppermost layer of the assembled batteries 23 and the front end of the negative electrode-side lead 30 is inserted into a negative electrode-side connector 31 of the printed wiring board 24 to be electrically connected. These connectors 29 and 31 are connected to the protective circuit 26 via wirings 32 and 33 (see FIG. 8) formed in the printed wiring board 24.

The thermistor 25 is used to detect a temperature of the single battery 21. Although not illustrated in FIG. 7, the thermistor 25 is installed near the single batteries 21 and a detection signal is transmitted to the protective circuit 26. The protective circuit 26 blocks a plus-side wiring 34a and a minus-side wiring 34b between the protective circuit 26 and the electrifying terminal 27 connected to an external device under a predetermined condition. Here, for example, the predetermined condition is that the detection temperature of the thermistor 25 be equal to or greater than a predetermined temperature. The predetermined condition is also that an overcharge, overdischarge, overcurrent, or the like of the single battery 21 be detected. The detection of the overcharge or the like is performed for the individual single batteries 21 or all of the single batteries 21. When the overcharge or the like is detected in the individual single batteries 21, a battery voltage may be detected, or a positive electrode potential or a negative electrode potential may be detected. In the latter case, lithium electrodes used as reference poles are inserted into the individual single batteries 21. In the case of FIGS. 7 and 8, wirings 35 are connected to detect the respective voltages of the single batteries 21 and detection signals are transmitted to the protective circuit 26 via the wirings 35.

As illustrated in FIG. 7, protective sheets 36 formed of rubber or resin are disposed on three side surfaces of the assembled batteries 23 excluding the side surface from which the positive electrode terminals 7 and the negative electrode terminals 6 protrude.

The assembled batteries 23 are accommodated along with the protective sheets 36 and the printed wiring board 24 inside an accommodation container 37. That is, the protective sheets 36 are disposed on both of the inner surfaces of the accommodation container 37 in the longer side direction and the inner surface in the shorter side direction, and the printed wiring board 24 is disposed on the inner surface opposite to the protective sheet 36 in the shorter side direction. The assembled batteries 23 are located in a space surrounded by the protective sheets 36 and the printed wiring board 24. A cover 38 is mounted on the upper surface of the accommodation container 37.

When the assembled batteries 23 are fixed, a thermal shrinkage tape may be used instead of the adhesive tape 22. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, in FIGS. 7 and 8, the single batteries 21 connected in series are illustrated. However, to increase a battery capacity, the single batteries 21 may be connected in parallel or may be connected in a combination form of series connection and parallel connection. The assembled battery packs can also be connected in series or in parallel.

According to the above-described embodiment, by providing the nonaqueous electrolyte batteries having the excellent charging and discharging cycle performance of the foregoing second embodiment, it is possible to provide the battery pack having the excellent charging and discharging cycle performance.

The form of the battery pack can be appropriately modified according to a use application. A use application of the battery pack according to the embodiment is preferably one which is required to show excellent cycle characteristics when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the battery pack using the nonaqueous electrolyte batteries with excellent high temperature characteristics is appropriately used for vehicles.

According to at least one of the above-described embodiments, by employing a step of obtaining a coprecipitated product containing Ti and Nb and a step of burning the coprecipitated product under condition of a burning temperature of 635° C. or higher and 1200° C. or lower, it is possible to provide a production method of a battery active material with high capacity, and excellent charging and discharging cycle performance, a battery active material produced by the production method, a nonaqueous electrolyte battery containing the battery active material, and a battery pack including the nonaqueous electrolyte battery.

EXAMPLES

Hereinafter, specific examples are described.

Example 1

As the starting materials, the dilute sulfuric acid solution of titanyl sulfate with the Ti molar concentration of 1.28 mol/L and the ethanol solution of niobium chloride with the Nb molar concentration of 0.5 mol/L were used. Both were mixed to obtain the transparent mixed solution having no precipitation of foreign material such as a hydroxide. The molar ratio of Ti and Nb was Nb/Ti=2.1. The ammonia water with a pH of 11 was added dropwise to the mixed solution while stirring the mixed solution, thereby adjusting the pH of the mixed solution to 8 and obtaining the white precipitated product. The obtained precipitated product was washed with pure water, filtrated, and dried at 80° C. using the heater, and also was pulverized in the mortar to loosen the aggregation. Then, the burning was carried out under the conditions of 1100° C., 12 hours and the air atmosphere. Then, the resultant product was pulverized in the mortar again. The composition of the active material was quantified by ICP analysis, and Nb/Ti=2.1 was confirmed.

The obtained active material powders were subjected to the wide-angle X-ray diffraction measurement under the conditions of the sampling interval of 0.01° and the scanning rate of 2°/min, and it was confirmed that the active material powders had the $TiNb_2O_7$ single phase and the peak attributed to a heterophase did not appear.

Figure 9:
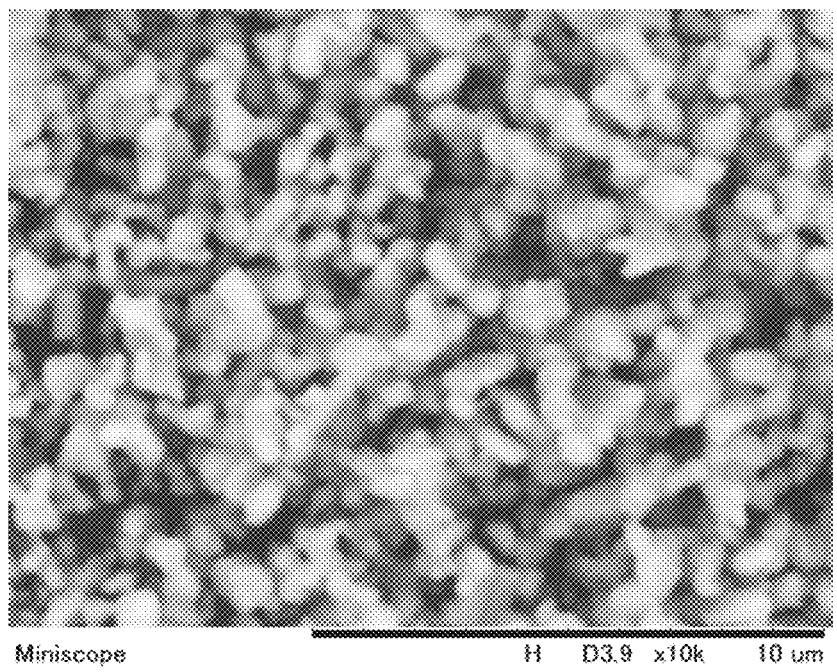
FIG. 9 is the SEM photograph of the niobium-titanium composite oxide of Example 1.

The representative SEM image is shown in FIG. 9. The 500 particles, the particle sizes of which were clearly observed in 10 pieces of the SEM images, were counted, and the average primary particle size was calculated by rounding the tens nm digit. As a result, it was found that the average primary particle size was 0.8 μm.

The slurry was prepared by adding and mixing 100 parts by weight of the obtained niobium-titanium composite oxide powder, 10 parts by weight of acetylene black, which is a conductive auxiliary agent, 10 parts by weight of the carbon nanofiber and 10 parts by weight of polyvinylidene fluoride (PVdF), which is a binder, to N-methylpyrrolidone (NMP). This slurry was applied on one side of the current collector, which is composed of an aluminum foil and has the thickness of 12 μm, and the applied current collector was dried and pressed to thereby producing the electrode with the coating weight of 25 g/m².

The electrolyte was prepared by dissolving 1 mol/L of the LiTFSI supporting salt in the mixed solution obtained by mixing ethylene carbonate (EC) and diethyl carbonate (DEC) with the ratio of 1:2. The obtained electrode was used as the working electrode, and the Li metal was used as the counter electrode and the reference electrode. Also, the three-electrode beaker cell with the electrolyte solution was produced in the argon atmosphere, and the charge-discharge characteristics were evaluated.

Example 2

The process to obtain the active material was carried out in the same manner as in Example 1. In addition, the carbon coating using sucrose was carried out for the obtained active material.

The active material was added into the mixed solvent of water and ethanol, and the sucrose was added thereto at 10 wt % with respect to the active material, followed by the mixing using the planetary ball mill. After the mixing, the mixture was dried at 80° C. to remove the solvent, and then, the burning in the Ar atmosphere at 600° C. for 1 hour was carried out. The carbon coating amount after the burning was calculated from the difference in the weights of the active material before and after the burning step, which was carried out in the air atmosphere at 1000° C. for 5 hours so as to completely remove the carbon coating, and it was found that the carbon coating amount was 2.1 wt %.

The production methods of the electrode and the three-electrode beaker cell were carried out in the same manner as in Example 1.

Example 3

The active material was obtained in the same manner as in Example 1 except that the burning temperature was set to 1100° C. and the burning time was set to 1 hour in the burning with the air atmosphere. The composition of the active material was quantified by inductively coupled plasma (ICP) analysis, and Nb/Ti=2.1 was confirmed. The obtained active material powders were subjected to the wide-angle X-ray diffraction measurement under the conditions of the sampling interval of 0.01° and the scanning rate of 2°/min, and it was confirmed that the active material powders had the $TiNb_2O_7$ single phase and the peak attributed to a heterophase did not appear.

Figure 10:
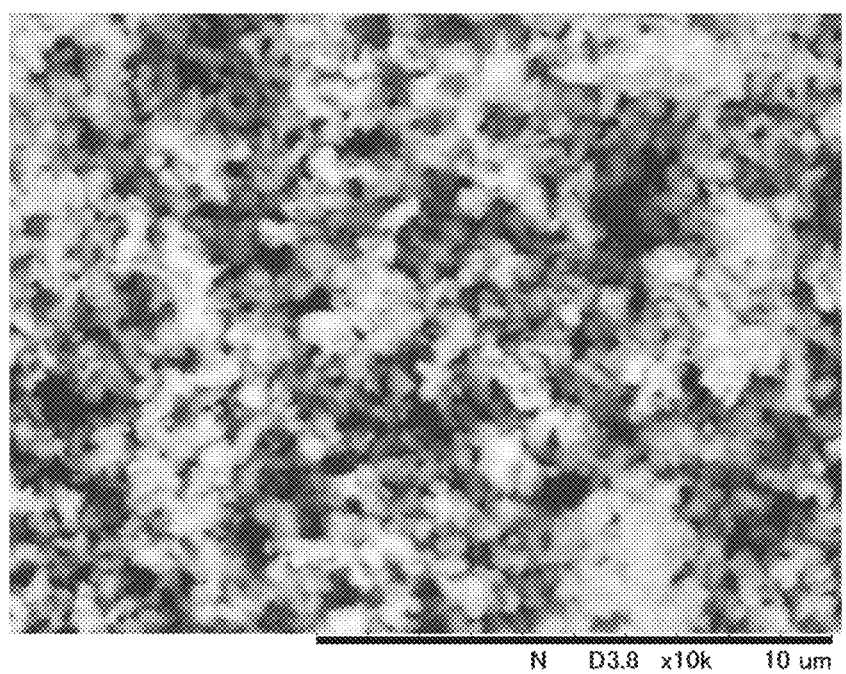
FIG. 10 is the SEM photograph of the niobium-titanium composite oxide of Example 3.

The representative SEM (Scanning Electron Microscope) image is shown in FIG. 10. The 500 particles, the particle sizes of which were clearly observed in 10 pieces of the SEM images, were counted, and the average primary particle size was calculated by rounding the tens nm digit. As a result, it was found that the average primary particle size was 0.5 μm. The production methods of the electrode and the three-electrode beaker cell were carried out in the same manner as in Example 1.

Example 4

Figure 15:
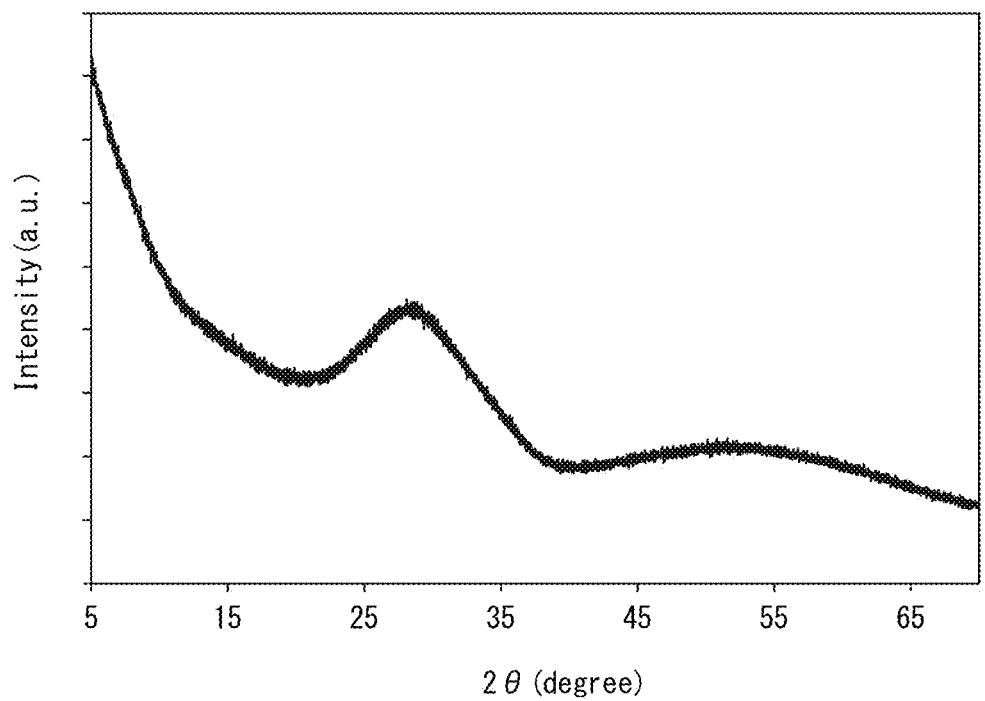
FIG. 15 is the X-ray diffraction diagram showing the result of the wide-angle X-ray diffraction measurement for the active material before burning in Example 4.

The process to obtain the active material was carried out in the same manner as in Example 3. In addition, the carbon coating using sucrose was carried out for the obtained active material. The active material was added into the mixed solvent of water and ethanol, and the sucrose was added thereto at 10 wt % with respect to the active material, followed by the mixing using the planetary ball mill. The mixture, which was not subjected to the burning, was subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 15. According to the X-ray diffraction diagram shown in FIG. 15, the peak attributed to $TiNb_2O_7$ phase was not observed in the mixture which was not subjected to the burning.

After the mixing, the mixture was dried at 80° C. to remove the solvent, and then, the burning in the FIG. 15, the peak attributed to $TiNb_2O_7$ phase was not observed in the mixture which was not subjected to the burning.

After the mixing, the mixture was dried at 80° C. to remove the solvent, and then, the burning in the Ar atmosphere at 600° C. for 1 hour was carried out. The carbon coating amount after the burning was calculated from the difference in the weights of the active material before and after another burning step, which was carried out in the air atmosphere at 1000° C. for 5 hours so as to completely remove the carbon coating, and it was found that the carbon coating amount was 2.4 wt %. The production methods of the electrode and the three-electrode beaker cell were carried out in the same manner as in Example 1.

Figure 16:
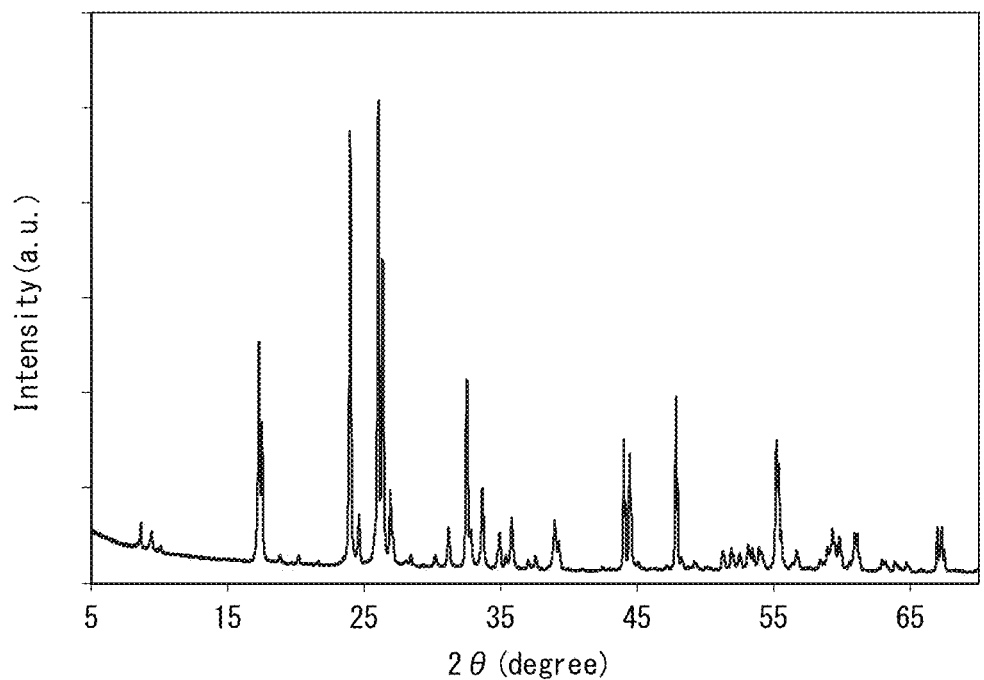
FIG. 16 is the X-ray diffraction diagram showing the result of the wide-angle X-ray diffraction measurement for the niobium-titanium composite oxide obtained in Example 4.

The obtained active material powders subjected to the burning was subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 16. According to the X-ray diffraction diagram shown in FIG. 16, it was found that the peak intensity ratio ($I_B/I_A$) was smaller than 0.8, the peak intensity ratio ($I_B/I_A$) being the ratio of the peak A, which appears at 2θ=25.61° to 26.21° and is attributed to the (003) plane, and the peak B, which appears at 2θ=26.12° to 26.54° and is attributed to the (-602) plane. It was confirmed that the crystal growth on the (-602) plane having difficulty in Li diffusion was suppressed in the active material powders obtained in Example 4.

Example 5

The active material was obtained in the same manner as in Example 3 except that the burning temperature was set to 1000° C. in the burning with the air atmosphere, and then, the carbon coating using sucrose was carried out.

Figure 11:
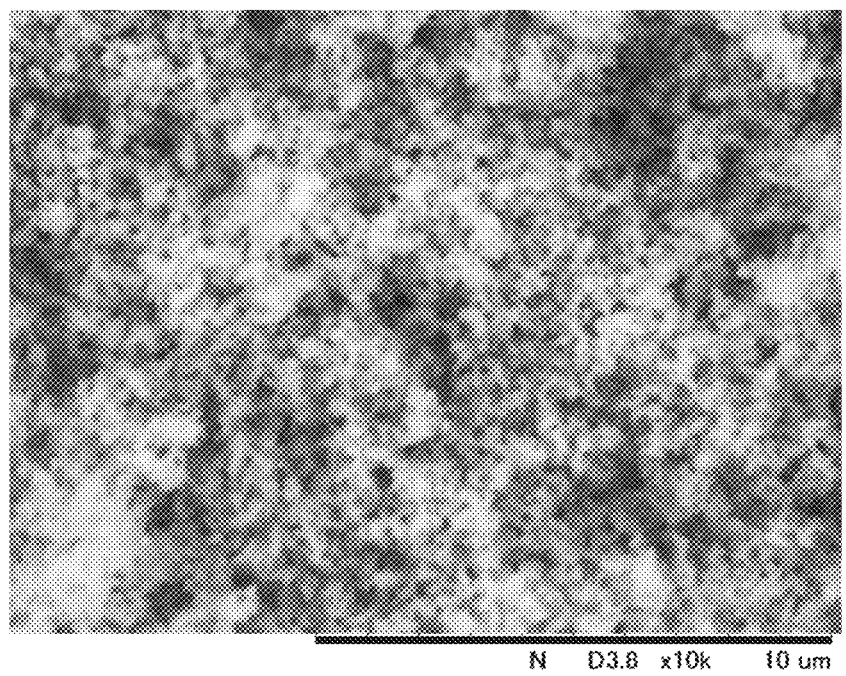
FIG. 11 is the SEM photograph of the niobium-titanium composite oxide of Example 5.

The composition of the active material was quantified by ICP analysis, and Nb/Ti=2.1 was confirmed. The obtained active material powders were subjected to the wide-angle X-ray diffraction measurement under the conditions of the sampling interval of 0.01° and the scanning rate of 2°/min, and it was confirmed that the active material powders had $TiNb_2O_7$ single phase and the peak attributed to a heterophase did not appear. The 500 particles, the particle sizes of which were clearly observed in 10 pieces of the SEM images, were counted, and the average primary particle size was calculated by rounding the tens nm digit. As a result, it was found that the average primary particle size was 0.3 μm. The representative SEM image is shown in FIG. 11.

The carbon coating amount was calculated in the same manner as in Examples 2 and 4. and it was found that the carbon coating amount was 2.6 wt %.

Figure 17:
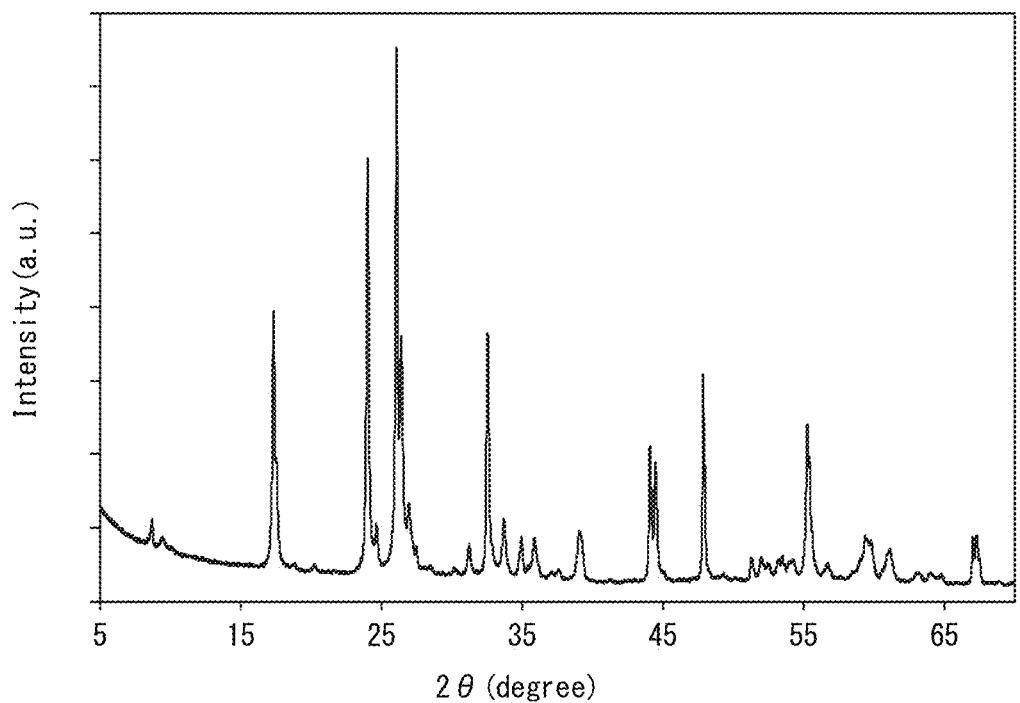
FIG. 17 is the X-ray diffraction diagram showing the result of the wide-angle X-ray diffraction measurement for the niobium-titanium composite oxide obtained in Example 5.

Also, the obtained active material powders subjected to the burning was subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 17. According to the X-ray diffraction diagram shown in FIG. 17, it was found that the peak intensity ratio ($I_B/I_A$) was smaller than 0.8, the peak intensity ratio ($I_B/I_A$) being the ratio of the peak A, which appears at 2θ=25.61° to 26.21° and is attributed to the (003) plane, and the peak B, which appears at 2θ=26.12° to 26.54° and is attributed to the (-602) plane. It was confirmed that the crystal growth on the (-602) plane having difficulty in Li diffusion was suppressed in the active material powders obtained in Example 5.

Example 6

The active material was obtained in the same manner as in Example 3 except that the burning temperature was set to 900° C. in the burning with the air atmosphere, and then, the carbon coating using sucrose was carried out.

The composition of the active material was quantified by ICP analysis, and Nb/Ti=2.1 was confirmed.

Figure 12:
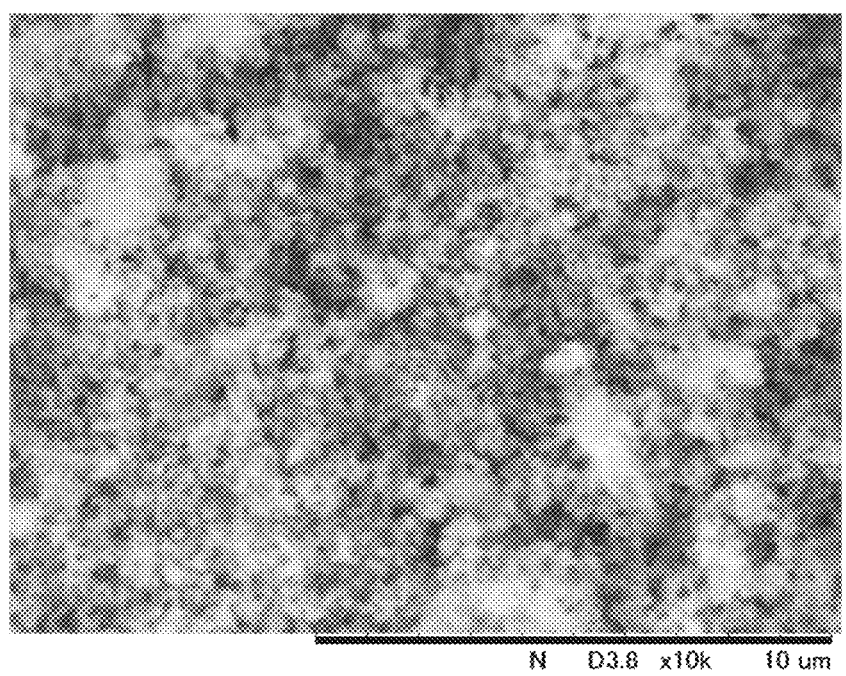
FIG. 12 is the SEM photograph of the niobium-titanium composite oxide of Example 6.

The obtained active material powders were subjected to the wide-angle X-ray diffraction measurement under the conditions of the sampling interval of 0.01° and the scanning rate of 2°/min, and it was confirmed that the active material powders had $TiNb_2O_7$ single phase and the peak attributed to a heterophase did not appear. The 500 particles, the particle sizes of which were clearly observed in 10 pieces of the SEM images, were counted, and the average primary particle size was calculated by rounding the tens nm digit. As a result, it was found that the average primary particle size was 0.2 μm. The representative SEM image is shown in FIG. 12.

The carbon coating amount was calculated in the same manner as in Example 4, and it was found that the carbon coating amount was 2.8 wt %.

Figure 18:
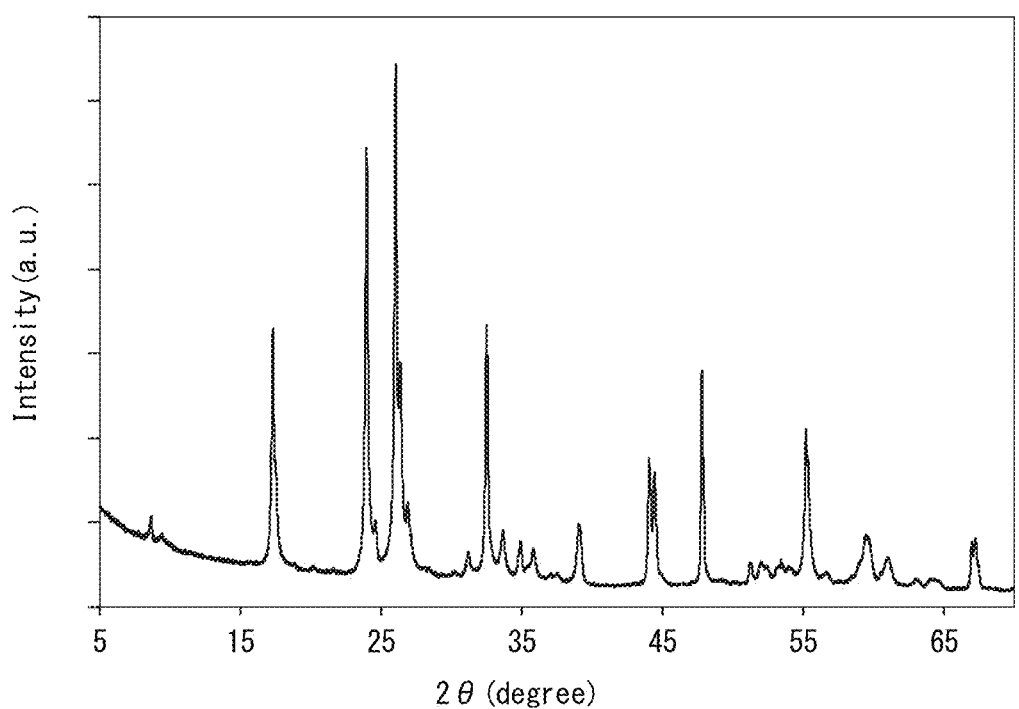
FIG. 18 is the X-ray diffraction diagram showing the result of the wide-angle X-ray diffraction measurement for the niobium-titanium composite oxide obtained in Example 6.

Also, the obtained active material powders subjected to the burning was subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 18. According to the X-ray diffraction diagram shown in FIG. 18, it was found that the peak intensity ratio ($I_B/I_A$) was smaller than 0.8, the peak intensity ratio ($I_B/I_A$) being the ratio of the peak A, which appears at 2θ=25.61° to 26.21° and is attributed to the (003) plane, and the peak B, which appears at 2θ=26.12° to 26.54° and is attributed to the (−602) plane. It was confirmed that the crystal growth on the (−602) plane having difficulty in Li diffusion was suppressed in the active material powders obtained in Example 6.

Example 7

The active material was obtained in the same manner as in Example 3 except that the burning temperature was set to 700° C. in the burning with the air atmosphere, and then, the carbon coating using sucrose was carried out.

The composition of the active material was quantified by ICP analysis, and Nb/Ti=2.1 was confirmed.

Figure 19:
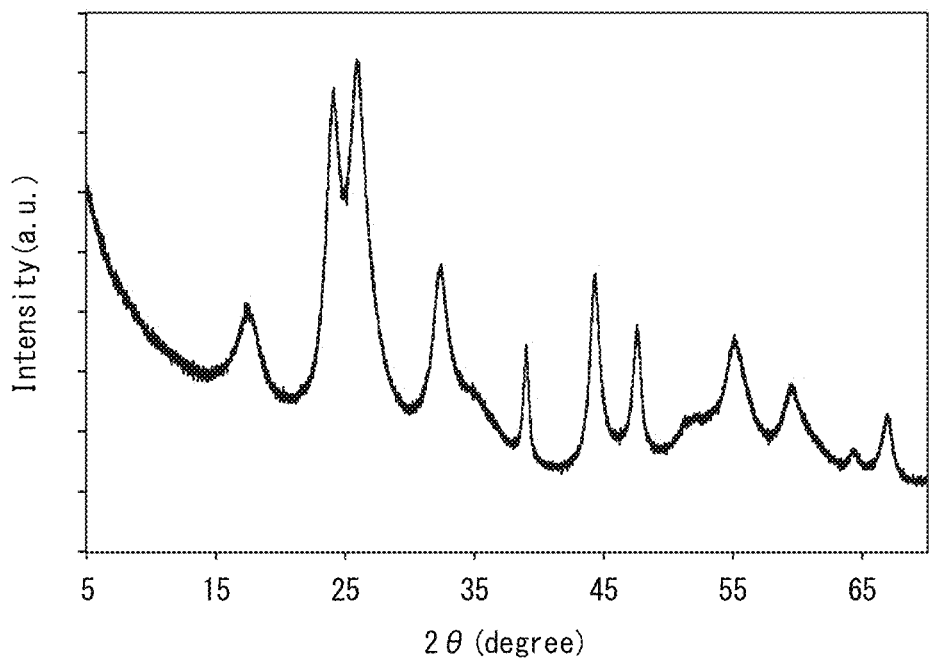
FIG. 19 is the X-ray diffraction diagram showing the result of the wide-angle X-ray diffraction measurement for the niobium-titanium composite oxide obtained in Example 7.

The obtained active material powders was subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 19. According to the X-ray diffraction diagram shown in FIG. 19, it could be confirmed that the active material powders had the $TiNb_2O_7$ single phase and the peak attributed to a heterophase did not appear. Also, the 500 particles, the particle sizes of which were clearly observed in 10 pieces of the SEM images, were counted, and the average primary particle size was calculated by rounding the tens nm digit. Then, the extremely fine microparticle with the particle size of 0.1 μm or less was found. The carbon coating amount was calculated in the same manner as in Example 4, and it was found that the carbon coating amount was 3.2 wt %.

Example 8

The active material was obtained in the same manner and conditions as in Example 1 except that the molar ratio of Ti and Nb was set to Nb/Ti=1.0 when mixing the dilute sulfuric acid solution of titanyl sulfate and the ethanol solution of niobium chloride. The composition of the active material was quantified by ICP analysis, and Nb/Ti=1.0 was confirmed. The 500 particles, the particle sizes of which were clearly observed in 10 pieces of the SEM images, were counted, and the average primary particle size was calculated by rounding the tens nm digit. As a result, it was found that the average primary particle size was 0.5 μm. The obtained active material powders were subjected to the wide-angle X-ray diffraction measurement under the conditions of the sampling interval of 0.01° and the scanning rate of 2°/min, and it was confirmed that the $TiNb_2O_7$ phase and the $TiO_2$ rutile phase were mixed.

Example 9

The active material was obtained in the same: manner and conditions as in Example 1 except that the molar ratio of Ti and Nb was set to Nb/Ti=5.0 when mixing the dilute sulfuric acid solution of titanyl sulfate and the ethanol solution of niobium chloride and that the burning temperature was set to 1200° C. The composition of the active material was quantified by ICP analysis, and Nb/Ti=5.0 was confirmed. The 500 particles, the particle sizes of which were clearly observed in 10 pieces of the SEM images, were counted, and the average primary particle size was calculated by rounding the tens nm digit. As a result, it was found that the average primary particle size was 1.0 μm. The obtained active material powders were subjected to the wide-angle X-ray diffraction measurement under the conditions of the sampling interval of 0.01° and the scanning rate of 2°/min, and it was confirmed that the $Ti_2Nb_{10}O_{29}$ phase was obtained as a single phase.

Example 10

The active material was obtained in the same manner and conditions as in Example 1 except that the molar ratio of Ti and Nb was set to Nb/Ti=15.0 when mixing the dilute sulfuric acid solution of titanyl sulfate and the ethanol solution of niobium chloride and that the burning temperature was set to 1200° C. The composition of the active material was quantified by ICP analysis, and Nb/Ti=15.0 was confirmed. The 10 500 particles, the particle sizes of which were clearly observed in 10 pieces of the SEM images, were counted, and the average primary particle size was calculated by rounding the tens nm digit. As a result, it was found that the average primary particle size was 0.9 μm. The obtained active material powders were subjected to the wide-angle X-ray diffraction measurement under the conditions of the sampling interval 0.01° of and the scanning rate of 2°/min, and it was confirmed that the $Ti_{10}Nb_{12}O_{29}$ phase and the $TiNb_{24}O_{62}$ phase were obtained as a multiphase.

Example 11

The active material was obtained in the same manner and conditions as in Example 1 except that the molar ratio of Ti and Nb was set to Nb/Ti=28.0 when mixing the dilute sulfuric acid solution of titanyl sulfate and the ethanol solution of niobium chloride and that the burning temperature was set to 1200° C. The composition of the active material was quantified by ICP analysis, and Nb/Ti=28.0 was confirmed. The 500 particles, the particle sizes of which were clearly observed in 10 pieces of the SEM images, were counted, and the average primary particle size was calculated by rounding the tens nm digit. As a result, it was found that the average primary particle size was 1.0 μm. The obtained active material powders were subjected to the wide-angle X-ray diffraction measurement under the conditions of the sampling interval of 0.01° and the scanning rate of 2°/min, and it was confirmed that the $TiNb_{24}O_{62}$ phase was obtained as a single phase.

Example 12

As the starting materials, the ammonium niobium oxalate aqueous solution with the Nb molar concentration of 0.82 mol/L and the titanium oxalate ammonium aqueous solution with the Ti molar concentration of 0.34 mol/L were used. Both were mixed such that the molar ratio of Ti and Nb became Nb/Ti=2.1. Then, the ammonia water with the pH of 11 was added dropwise to the mixed solution while stirring the mixed solution, thereby adjusting the pH of the mixed solution to 8 and obtaining the white precipitated product. The obtained precipitated product was washed with pure water, filtrated, and dried at 80° C. using the heater. Then the precipitated product was pulverized by the dry type ball mill to loosen the aggregation. Then, the burning was carried out under the conditions of 1100° C., 1 hour and the air atmosphere. Then, the resultant product was pulverized in the mortar again.

The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 µm. The obtained active material powders were subjected to the wide-angle X-ray diffraction measurement under the conditions of the sampling interval of 0.01° and the scanning rate of 2°/min, and it was confirmed that the TiNb$_2$O$_7$ phase was obtained as a single phase.

Example 13

The active material was obtained in the same manner as in Example 4 except that the burning temperature was set to 1200° C. The composition of the active material was quantified by ICP analysis, and Nb/Ti=2.1 was confirmed. The obtained active material powders were subjected to the wide-angle X-ray diffraction measurement under the conditions of the sampling interval of 0.01° and the scanning rate of 2°/min, and it was confirmed that the active material powders had TiNb$_2$O$_7$ single phase and the peak attributed to a heterophase did not appear. The 500 particles, the particle sizes of which were clearly observed in 10 pieces of the SEM images, were counted, and the average primary particle size was calculated by rounding the tens nm digit. As a result, it was found that the average primary particle size was 0.6 µm. The carbon coating amount after the burning was calculated from the difference in the weights of the active material before and after another burning step, which was carried out in the air atmosphere at 1000° C. for 5 hours so as to completely remove the carbon coating, and it was found that the carbon coating amount was 2.4 wt %. The production methods of the electrode and the three-electrode beaker cell were carried out in the same manner as in Example 1.

Figure 20:
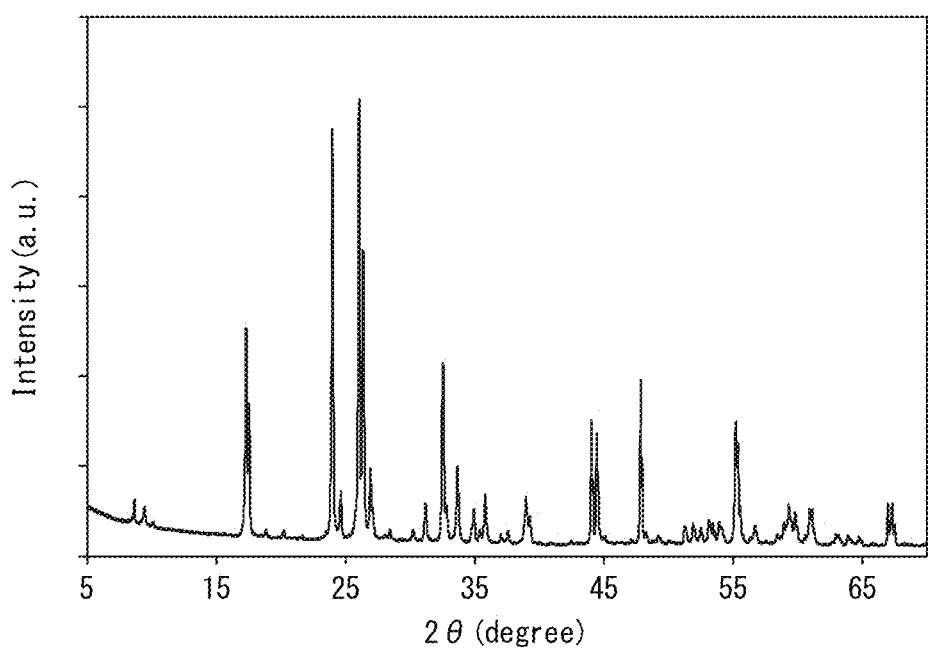
FIG. 20 is the X-ray diffraction diagram showing the result of the wide-angle X-ray diffraction measurement for the niobium-titanium composite oxide obtained in Example 13.

Also, the obtained active material powders subjected to the burning was subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 20. According to the X-ray diffraction diagram shown in FIG. 20, it was found that the peak intensity ratio ($I_B/I_A$) was smaller than 0.8, the peak intensity ratio ($I_B/I_A$) being the ratio of the peak A, which appears at 2θ=25.61° to 26.21° and is attributed to the (003) plane, and the peak B, which appears at 2θ=26.12° to 26.54° and is attributed to the (−602) plane. It was confirmed that the crystal growth on the (−602) plane having difficulty in Li diffusion was suppressed in the active material powders obtained in Example 13.

Example 14

Figure 21:
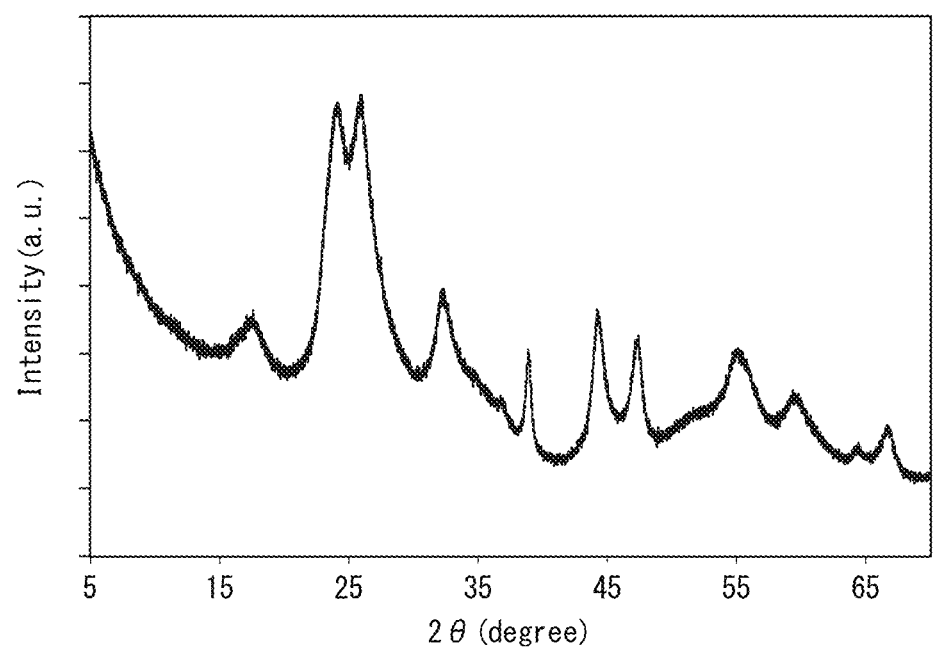
FIG. 21 is the X-ray diffraction diagram showing the result of the wide-angle X-ray diffraction measurement for the niobium-titanium composite oxide obtained in Example 14.

The active material was obtained in the same manner as in Example 4 except that the burning temperature was set to 635° C. The composition of the active material was quantified by ICP analysis, and Nb/Ti=2.1 was confirmed. The obtained active material powders were subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 21. According to the X-ray diffraction diagram shown in FIG. 21, it could be confirmed that the active material powders had the TiNb$_2$O$_7$ single phase and the peak attributed to a heterophase did not appear. Also, the 500 particles, the particle sizes of which were clearly observed in 10 pieces of the SEM images, were counted, and the average primary particle size was calculated by rounding the tens nm digit.

As a result, it was found that the average primary particle size was 0.1 µm or less. The carbon coating amount after the burning was calculated from the difference in the weights of the active material before and after another burning step, which was carried out in the air atmosphere at 1000° C. for 5 hours so as to completely remove the carbon coating, and it was found that the carbon coating amount was 2.8 wt %. The production methods of the electrode and the three-electrode beaker cell were carried out in the same manner as in Example 1.

Example 15

The active material was obtained in the same manner as in Example 4 except that the burning time was set to 36 seconds. The composition of the active material was quantified by ICP analysis, and Nb/Ti=2.1 was confirmed. The obtained active material powders were subjected to the wide-angle X-ray diffraction measurement under the conditions of the sampling interval of 0.01° and the scanning rate of 2°/min, and it was confirmed that the active material powders had TiNb$_2$O$_7$ single phase and the peak attributed to a heterophase did not appear. The 500 particles, the particle sizes of which were clearly observed in 10 pieces of the SEM images, were counted, and the average primary particle size was calculated by rounding the tens nm digit. As a result, it was found that the average primary particle size was 0.4 µm or less. Herein, the particles were anisotropically grown in the uniaxial direction, and the particle size was calculated from the longitudinal direction of the primary particles. The carbon coating amount after the burning was calculated from the difference in the weights of the active material before and after another burning step, which was carried out in the air atmosphere at 1000° C. for 5 hours so as to completely remove the carbon coating, and it was found that the carbon coating amount was 2.8 wt %. The production methods of the electrode and the three-electrode beaker cell were carried out in the same manner as in Example 1.

Example 16

The active material was obtained in the same manner as in Example 12 except that the ammonia water with the pH of 10.6 was used as a pH adjusting agent. The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 µm. The obtained active material powders were subjected to the wide-angle X-ray diffraction measurement under the conditions of the sampling interval of 0.01° and the scanning rate of 2°/min, and it was confirmed that the TiNb$_2$O$_7$ phase was obtained as a single phase.

Example 17

The active material was obtained in the same manner as in Example 12 except that the ammonia water with the pH of 9.6 was used as a pH adjusting agent, and the ammonium niobium oxalate aqueous solution with the Nb molar concentration of 2.52 mol/L and the titanium oxalate ammonium aqueous solution with the Ti molar concentration of 1.21 mol/L were used. The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 µm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 18

The ammonia water with the pH of 8.6 was used as a pH adjusting agent, and the ammonium niobium oxalate aqueous solution with the Nb molar concentration of 2.52 mol/L and the titanium oxalate ammonium aqueous solution with the Ti molar concentration of 1.21 mol/L were used. Both were mixed such that the molar ratio of Ti and Nb became Nb/Ti=2.1, and the mixed solution was added dropwise to the ammonia water which was the pH adjusting agent, thereby obtaining the white precipitated product. The obtained precipitated product was washed with pure water, filtrated, and dried at 80° C. using the heater. Then the precipitated product was pulverized by the dry type ball mill to loosen the aggregation. Then, the burning was carried out under the conditions of 1100° C., 1 hour and the air atmosphere. Then, the resultant product was pulverized in the mortar again. The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.8 µm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 19

The active material was obtained in the same manner as in Example 12 except that the starting material solution obtained by mixing the Nb-containing solution and Ti-containing solution, in which the pH value was 2.1 and the molar ratio of Ti and Nb was Nb/Ti=2.1, was used. The obtained precipitated product was washed with pure water, filtrated, and dried at 80° C. using the heater. Then the precipitated product was pulverized by the dry type ball mill to loosen the aggregation. Then, the burning was carried out under the conditions of 1100° C. 1 hour and the air atmosphere. Then, the resultant product was pulverized in the mortar again.

The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 µm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 20

The active material was obtained in the same manner as in Example 12 except that the starting material solution obtained by mixing the Nb-containing solution and Ti-containing solution, in which the pH value was 3.1 and the molar ratio of Ti and Nb was Nb/Ti=2.1, was used. The obtained precipitated product was washed with pure water, filtrated, and dried at 80° C. using the heater. Then the precipitated product was pulverized by the dry type ball mill to loosen the aggregation. Then, the burning was carried out under the conditions of 1100° C., 1 hour and the air atmosphere. Then, the resultant product was pulverized in the mortar again.

The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.8 µm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 21

The active material was obtained in the same manner as in Example 12 except that the starting material solution obtained by mixing the Nb-containing solution and Ti-containing solution, in which the pH value was 4.1 and the molar ratio of Ti and Nb was Nb/Ti=2.1, was used. The obtained precipitated product was washed with pure water, filtrated, and dried at 80° C. using the heater. Then the precipitated product was pulverized by the dry type ball mill to loosen the aggregation. Then, the burning was carried out under the conditions of 1100° C., 1 hour and the air atmosphere. Then, the resultant product was pulverized in the mortar again. The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.8 µm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 22

As the raw material of Nb, the solution with the molar ratio of 0.5 mol/L was prepared by dissolving the niobium oxide $Nb_2O_5$ in the hydrofluoric acid (the concentration of 48 wt %). In the same manner, as the raw material of Ti, the solution with the molar ratio of 0.5 mol/L was prepared by dissolving the titanium oxide $TiO_2$ in the hydrofluoric acid (the concentration of 48 wt %). Both were mixed at arbitrary ratio so as to prepare the solution with Nb/Ti=2.1 and the pH value of 1.2. Then, the ammonia water with the pH of 11 was added dropwise o the mixed solution while stirring the mixed solution, thereby adjusting the pH of the mixed solution to 8 and obtaining the white precipitated product.

The obtained precipitated product was sufficiently washed with the ammonia water and filtrated. Then, the precipitated product was further washed with pure water so as to sufficiently remove the remaining the hydrofluoric acid, and was dried at 80° C. using the heater. Then the precipitated product was pulverized by the dry type ball mill to loosen the aggregation. Then, the burning was carried out under the conditions of 1100° C., 1 hour and the air atmosphere. Then, the resultant product was pulverized in the mortar again. The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 μm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 23

The active material was obtained in the same manner as in Example 22 except that the niobium oxide $Nb(OH)_5$ was used as the raw material of Nb and the titanium oxyhydroxide $TiO(OH)_2$ was used as the raw material of Ti. The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 μm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 24

The active material was obtained in the same manner as in Example 22 except that the niobium ethoxide (Nb $(OCH_2H_5)_5$) was used as the raw material of Nb and the isopropyl titanate ($C_{12}14_{28}O_4Ti$) was used as the raw material of Ti. The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 μm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 25

The active material was obtained in the same manner as in Example 22 except that the solution with Nb/Ti=2.1 and the pH value of 1.2 was prepared by dissolving the mixed powders obtained by nixing $Nb_2O_5$ and $TiO_2$ at Nb/Ti=2.1 in the hydrofluoric acid (the concentration of 48 wt %). The composition of the active material was quantified by ICP analysis, and Nb/Ti=2.1 was confirmed. The 500 particles, the particle sizes of which were clearly observed in 10 pieces of the SEM images, were counted, and the average primary particle size was calculated by rounding the tens nm digit. As a result, it was found that the average primary particle size was 0.9 μm. The obtained active material powders were subjected to the wide-angle X-ray diffraction measurement under the conditions of the sampling interval of 0.01° and the scanning rate of 2°/min, and it was confirmed that the $TiNb_2O_7$ phase was obtained as a single phase.

Example 26

The active material was obtained in the same manner as in Example 4 except that the burning time was set to 15 hours. The composition of the active material was quantified by ICP analysis, and Nb/Ti=2.1 was confirmed. The obtained active material powders were subjected to the wide-angle X-ray diffraction measurement under the conditions of the sampling interval of 0.01° and the scanning rate of 2°/min, and it was confirmed that the active material powders had $TiNb_2O_7$ single phase and the peak attributed to a heterophase did not appear. The 500 particles, the particle sizes of which were clearly observed in 10 pieces of the SEM images, were counted, and the average primary particle size was calculated by rounding the tens nm digit. As a result, it was found that the average primary particle size was 2.0 μm. Herein, the particles were anisotropically grown in the uniaxial direction, and the particle size was calculated from the longitudinal direction of the primary particles. The carbon coating amount after the burning was calculated from the difference in the weights of the active material before and after another burning step, which was carried out in the air atmosphere at 1000° C. for 5 hours so as to completely remove the carbon coating, and it was found that the carbon coating amount was 2.1 wt %. The production methods of the electrode and the three-electrode beaker cell were carried out in the same manner as in Example 1.

Comparative Example 1

As a comparative example, $TiNb_2O_7$ was synthesized by the solid phase method. The titanium oxide and the niobium oxide were weighed at the molar ratio of 1:1. These were added together with ethanol in the mortar, and mixed. Then, the mixture was added in the alumina crucible, and the pre-burning was carried out under the air atmosphere at 1000° C. for 12 hours in the electric furnace. After natural cooling, the mixture was pulverized and mixed in the mortar, and then subjected to the thermal treatment at 1100° C. for 12 hours.

Figure 13:
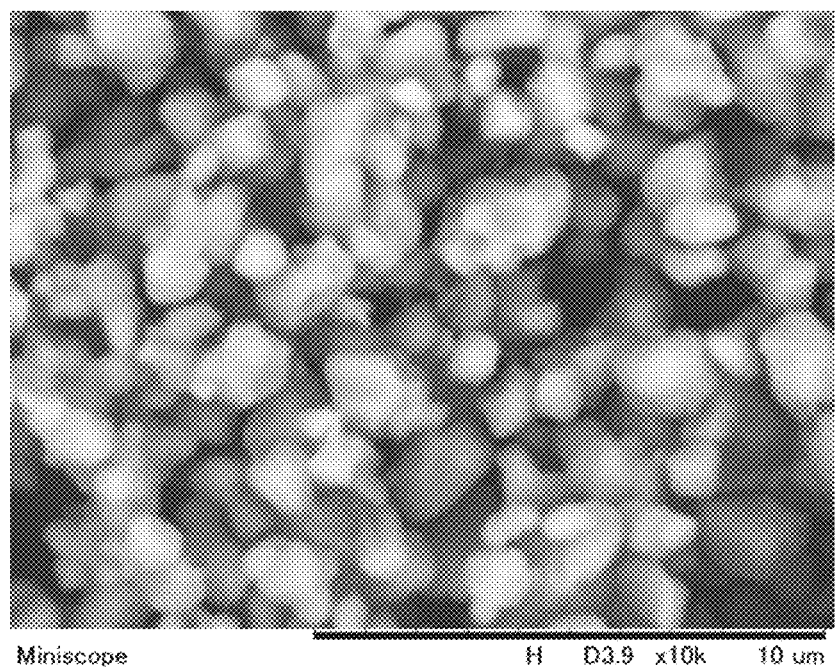
FIG. 13 is the SEM photograph of the niobium-titanium composite oxide of Comparative Example 1.

The composition of the active material was quantified by ICP analysis, and $TiNb_2O_7$ (y 0) was found. The obtained active material powders were subjected to the wide-angle X-ray diffraction measurement under the conditions of the sampling interval of 0.01° and the scanning rate of 2°/min, and it was confirmed that the active material powders had $TiNb_2O_7$ single phase and the peak attributed to a heterophase did not appear. The representative SEM image is shown in FIG. 13. The average primary particle size was calculated using 10 pieces of the SEM images (the tens nm digit was rounded), and it was found that the average primary particle size was 1.3 μm or less.

Comparative Example 2

The active material was obtained in the same manner as in Comparative Example 1 except that the burning temperature was set to 1100° C., the burning time was set to 12 hours, and the pre-burning was not carried out. The obtained active material powders were subjected to the wide-angle X-ray diffraction measurement under the conditions of the sampling interval of 0.01° and the scanning rate of 2°/min. As a result, it was confirmed that the crystallinity of $TiNb_2O_7$ was low due to the insufficient reaction. Also, the main peak attributed to $Ti_2Nb_{10}O_{29}$ was confirmed as a heterophase in addition to the peak attributed to the single phase.

Comparative Example 3

The active material was obtained in the same manner as in Example 4 except that the burning temperature was set to 1300° C. The composition of the active material was quantified by ICP analysis, and Nb/Ti=2.1 was confirmed. The obtained active material powders were subjected to the wide-angle X-ray diffraction measurement under the conditions of the sampling interval of 0.01° and the scanning rate of 2°/min, and it was confirmed that the active material powders had $TiNb_2O_7$ single phase and the peak attributed to a heterophase did not appear. The 500 particles, the particle sizes of which were clearly observed in 10 pieces of the SEM images, were counted, and the average primary particle size was calculated by rounding the tens inn digit. As a result, it was found that the average primary particle size was 3.6 μm. Herein, the particles were anisotropically grown in the uniaxial direction, and the particle size was calculated from the longitudinal direction of the primary particles. The carbon coating amount after the burning was calculated from the difference in the weights of the active material before and after another burning step, which was carried out in the air atmosphere at 1000° C. for 5 hours so as to completely remove the carbon coating, and it was found that the carbon coating amount was 1.8 wt %. The production methods of the electrode and the three-electrode beaker cell were carried out in the same manner as in Example 1.

Comparative Example 4

Figure 22:
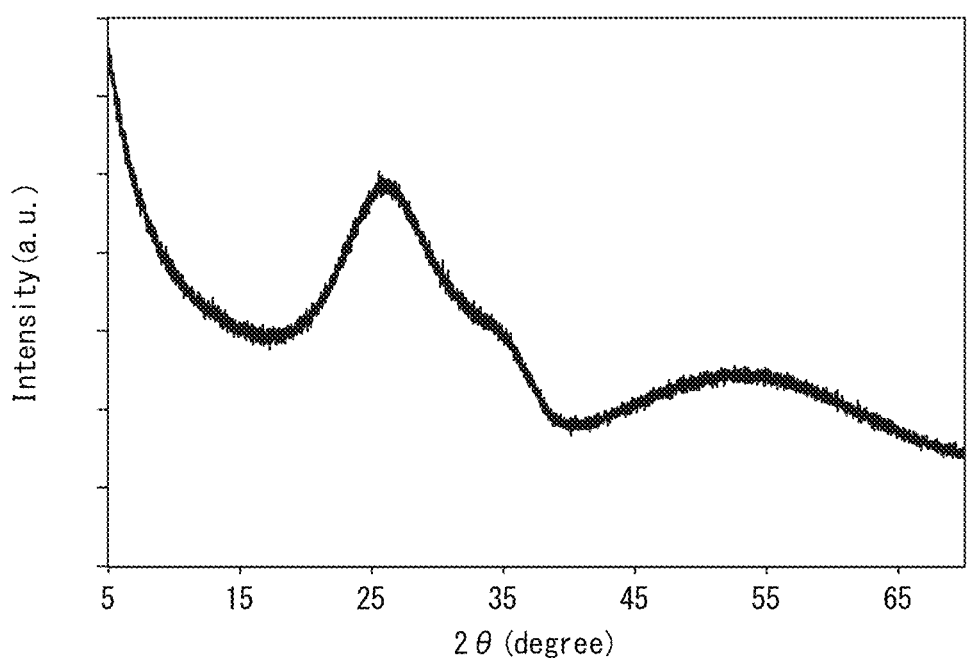
FIG. 22 is the X-ray diffraction diagram showing the result of the wide-angle X-ray diffraction measurement for the active material powder obtained in Comparative Example 4.

The active material was obtained in the same manner as in Example 4 except that the burning temperature was set to 600° C. The composition of the active material was quantified by ICP analysis, and Nb/Ti=2.1 was confirmed. The obtained active material powders were subjected to the wide-angle X-ray diffraction measurement under the conditions of the sampling interval of 0.01° and the scanning rate of 2°/min. The X-ray diffraction diagram obtained by the wide-angle X-ray diffraction measurement is shown in FIG. 22. According to the X-ray diffraction diagram shown in FIG. 22, the peak attributed to $TiNb_2O_7$ phase was not observed in the mixture which was not subjected to the burning. Also, the 500 particles, the particle sizes of which were clearly observed in 10 pieces of the SEM images, were counted, and the average primary particle size was calculated by rounding the tens nm digit. As a result, it was found that the average primary particle size was 0.1 μm or less. Herein, the particles were anisotropically grown in the uniaxial direction, and the particle size was calculated from the longitudinal direction of the primary particles. The carbon coating amount after the burning was calculated from the difference in the weights of the active material before and after another burning step, which was carried out in the air atmosphere at 1000° C. for 5 hours so as to completely remove the carbon coating, and it was found that the carbon coating amount was 2.8 wt %. The production methods of the electrode and the three-electrode beaker cell were carried out in the same manner as in Example 1.

Comparative Example 5

The active material was obtained in the same manner and conditions as in Example 8 except that the molar ratio of Ti and Nb was set to Nb/Ti=0.9 when mixing the dilute sulfuric acid solution of titanyl sulfate and the ethanol solution of niobium chloride. The composition of the active material was quantified by ICP analysis, and Nb/Ti=0.8 was confirmed. The 500 particles, the particle sizes of which were clearly observed in 10 pieces of the SEM images, were counted, and the average primary particle size was calculated by rounding the tens nm digit. As a result, it was found that the average primary particle size was 0.5 μm. The obtained active material powders were subjected to the wide-angle X-ray diffraction measurement under the conditions of the sampling interval of 0.01° and the scanning rate of 2°/min, and it was confirmed that the $TiNb_2O_7$ phase and the $TiO_2$ rutile phase were mixed. However, the intensity and integrated intensity of the spectrum attributed to the $TiNb_2O_7$ phase were smaller than those in Example 8, and it was speculated that the crystallinity of the $TiNb_2O_7$ phase was lowered.

Comparative Example 6

The active material was tried to be obtained in the same manner and conditions as in Example 11 except that the molar ratio of Ti and Nb was set to Nb/Ti=29.0 when mixing the dilute sulfuric acid solution of titanyl sulfate and the ethanol solution of niobium chloride and that the burning temperature was set to 1200° C. The composition of the active material was quantified by ICP analysis, and Nb/Ti=29.0 was confirmed. The 500 particles, the particle sizes of which were clearly observed in 10 pieces of the SEM images, were counted, and the average primary particle size was calculated by rounding the tens nm digit. As a result, it was found that the average primary particle size was 1.0 μm. The obtained active material powders were subjected to the wide-angle X-ray diffraction measurement under the conditions of the sampling interval of 0.01° and the scanning rate of 2°/min, and it was confirmed that the $TiNb_{24}O_{62}$ phase was obtained as a single phase. However, the intensity and integrated intensity of the spectrum attributed to the $TiNb_{24}O_{62}$ phase were smaller than those in Example 11, and it was speculated that the crystallinity of the $TiNb_{24}O_{62}$ phase was lowered.

Comparative Example 7

The active material was tried to be obtained in the same manner and conditions as in Example 18 except that the ammonia water with the pH of 7.6 was used as a pH adjusting agent. However, because the pH value of the pH adjusting agent was close to neutrality, the white precipitated product was not produced, and the active material could not be obtained.

Tables 1-3 describes the initial discharging capacity per unit weight of the active material (excluding the carbon coating) and the 20 C/0.2 C discharging capacity ratio (%), which were obtained by the measurements for Examples and Comparative Examples at the evaluation temperature of 25° C. and the cut-off electric potential of 3.0-1.0 V

TABLE 1

|  | Nb/Ti after burning | Nb/Ti after burning | Nb/Ti after burning | Nb/Ti after burning | Average primary particle size (μm) | Initial discharging capacity (mAh/g) | 20 C/0.2 C discharging capacity ratio (%) |
|---|---|---|---|---|---|---|---|
| Example 1 | 2.1 | 1100 | 12 | Absent | 0.8 | 287 | 75 |
| Example 2 | 2.1 | 1100 | 12 | Present | 0.8 | 292 | 82 |
| Example 3 | 2.1 | 1100 | 1 | Absent | 0.5 | 284 | 81 |
| Example 4 | 2.1 | 1100 | 1 | Present | 0.5 | 297 | 92 |
| Example 5 | 2.1 | 1000 | 1 | Present | 0.3 | 296 | 94 |
| Example 6 | 2.1 | 900 | 1 | Present | 0.2 | 295 | 88 |
| Example 7 | 2.1 | 700 | 1 | Present | 0.1 or less | 297 | 70 |
| Example 8 | 1.0 | 1100 | 12 | Absent | 0.5 | 220 | 94 |
| Example 9 | 5.0 | 1200 | 12 | Absent | 1.0 | 248 | 86 |
| Example 10 | 15 | 1200 | 12 | Absent | 1.1 | 248 | 85 |
| Example 11 | 28 | 1200 | 12 | Absent | 1.0 | 251 | 88 |
| Example 12 | 2.1 | 1100 | 1 | Absent | 0.9 | 286 | 81 |
| Example 13 | 2.1 | 1200 | 1 | Present | 0.6 | 294 | 89 |

TABLE 2

|  | Nb/Ti after burning | Nb/Ti after burning | Nb/Ti after burning | Nb/Ti after burning | Average primary particle size (μm) | Initial discharging capacity (mAh/g) | 20 C/0.2 C discharging capacity ratio (%) |
|---|---|---|---|---|---|---|---|
| Example 14 | 2.1 | 1100 | 1 | Present | 0.1 or less | 296 | 74 |
| Example 15 | 2.1 | 1100 | 0.01 | Present | 0.4 | 295 | 96 |
| Example 16 | 2.1 | 1100 | 1 | Absent | 0.9 | 284 | 79 |
| Example 17 | 2.1 | 1100 | 1 | Absent | 0.8 | 286 | 85 |
| Example 18 | 2.1 | 1100 | 1 | Absent | 0.8 | 284 | 84 |
| Example 19 | 2.1 | 1100 | 1 | Absent | 0.9 | 286 | 81 |
| Example 20 | 2.1 | 1100 | 1 | Absent | 0.8 | 288 | 83 |
| Example 21 | 2.1 | 1100 | 1 | Absent | 0.8 | 288 | 84 |
| Example 22 | 2.1 | 1100 | 1 | Absent | 0.9 | 285 | 84 |
| Example 23 | 2.1 | 1100 | 1 | Absent | 0.9 | 284 | 86 |
| Example 24 | 2.1 | 1100 | 1 | Absent | 0.9 | 286 | 86 |
| Example 25 | 2.1 | 1100 | 1 | Absent | 0.9 | 282 | 81 |
| Example 26 | 2.1 | 1100 | 15 | Present | 2 | 272 | 68 |

TABLE 3

|  | Nb/Ti after burning | Nb/Ti after burning | Nb/Ti after burning | Nb/Ti after burning | Average primary particle size (μm) | Initial discharging capacity (mAh/g) | 20 C/0.2 C discharging capacity ratio (%) |
|---|---|---|---|---|---|---|---|
| Comparative Example 1 | (*1) | (*2) | (*2) | Absent | 1.3 | 276 | 70 |
| Comparative Example 2 | (*1) | (*3) | (*3) | Absent | 1.3 | 255 | 65 |
| Comparative Example 3 | 2.1 | 1300 | 1 | Present | 3.6 | 259 | 92 |
| Comparative Example 4 | 2.1 | 600 | 1 | Present | 0.1 or less | Impossible to charge and discharge | Impossible to charge and discharge |
| Comparative Example 5 | 0.9 | 1100 | 1 | Present | 0.8 | 199 | 81 |

TABLE 3-continued

|  | Nb/Ti after burning | Nb/Ti after burning | Nb/Ti after burning | Nb/Ti after burning | Average primary particle size (μm) | Initial discharging capacity (mAh/g) | 20 C/0.2 C discharging capacity ratio (%) |
|---|---|---|---|---|---|---|---|
| Comparative Example 6 | 29 | 1200 | 12 | Absent | 1.4 | 243 | 65 |
| Comparative Example 7 | 2.1 | 1100 | 1 | Absent | Impossible to synthesize | Impossible to synthesize | Impossible to synthesize |

(*1) The production was carried out by the solid phase method.
(*2) The pre-burning (1000° C. × 12 hours) and the main burning (1100° C. × 12 hours were carried out.
(*3) The pre-burning (1000° C. × 12 hours) was not carried out, and the main burning (1100° C. × 12 hours) were carried out alone.

As shown in Tables 1-3. it was found that the battery active materials of Examples 1-26 were excellent in the battery characteristics compared with the battery active materials of Comparative Examples 1 and 2 even though the burning times were shorter.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A production method of a battery active material, the method comprising:

mixing a first solution with a pH of 5 or lower, in which a Ti compound is dissolved, and a second solution with a pH of 5 or lower, in which a Nb compound is dissolved to form a mixture, such that a molar ratio of Ti and Nb (Nb/Ti) in the mixture is adjusted within a range of 1≤Nb/Ti≤28, and then further adding to the mixture an alkali solution with a pH of 8 or higher; thereby obtaining a coprecipitated product comprising Ti and Nb and burning the coprecipitated product at a burning temperature of 635° C. or higher and 1200° C. or lower, wherein the battery active material obtained by the burning is represented by formula (1):

$$Ti_{x-a}M1_aNb_{y-b}M2_bO_z \quad (1)$$

wherein, z=2(x+a)+2.5(y+b) is satisfied; x, y, a, b and z respectively satisfy 1≤(y−b)/(x−a)≤28, 0<x≤1, 0<y≤1, 0≤a≤0.1 and 0≤b≤0.1; and M1 and M2 each independently represents one, or two or more elements selected from the group consisting of Ti, Nb, Zr, B, Na, Mg, Al, Si, S, P, K, Ca, Mo, W, Cr, Mn, Co, Ni and Fe.

2. The production method according to claim 1, wherein a burning time of the burning is 30 seconds or more and 12 hours or less.

3. The production method according to claim 1, wherein the Ti compound is any of titanyl sulfate, titanium oxide, titanium ammonium oxalate, metatitanic acid, isopropyl titanate and titanium chloride.

4. The production method according to claim 3, wherein the Nb compound is any of niobium chloride, niobium hydroxide, ammonium niobium oxalate, niobium oxide and niobium ethoxide.

5. The production method according to claim 4, further comprising adding a carbon source to the battery active material obtained after the burning, and then additionally burning the battery active material and the carbon source in a reducing atmosphere.

6. The production method according to claim 1, wherein the Nb compound is any of niobium chloride, niobium hydroxide, ammonium niobium oxalate, niobium oxide and niobium ethoxide.

7. The production method according to claim 1, further comprising adding a carbon source to the battery active material obtained after the burning, and then additionally burning the battery active material and the carbon source in a reducing atmosphere.

8. The production method according to claim 1, wherein M1 and M2 each independently represents one or two elements selected from the group consisting of Ti and Nb.

9. A production method of a battery active material comprising:

obtaining a coprecipitated product comprising Ti and Nb by mixing a solution, in which a Ti compound and a Nb compound are dissolved, a molar ratio of Ti and Nb (Nb/Ti) is adjusted within a range of 1≤Nb/Ti≤28, and a pH of the solution is adjusted to 5 or lower, with an alkali solution with a pH of 8 or higher; and burning the coprecipitated product at a burning temperature of 635° C. or higher and 1200° C. or lower, wherein a composition of the battery active material obtained by the burning is represented by formula (1):

$$Ti_{x-a}M1_aNb_{y-b}M2_bO_z \quad (1)$$

wherein, z=2(x+a)+2.5(y+b) is satisfied; x, y, a, b and z respectively satisfy 1≤(y−b)/ (x−a)≤28, 0<x≤1, 0<y≤1, 0≤a≤0.1 and 0≤b≤0.1; M1 and M2 each independently represents one, or two or more elements selected from the group consisting of Ti, Nb, Zr, B, Na, Mg, Al, Si, S, P, K, Ca, Mo, W, Cr, Mn, Co, Ni and Fe.

10. The production method according to claim 9, wherein a burning time of the burning is 1 hour or more and 12 hours or less.

11. The production method according to claim 9, wherein the Ti compound is any of titanyl sulfate, titanium oxide, titanium ammonium oxalate, metatitanic acid, isopropyl titanate and titanium chloride.

12. The production method according to claim 9, wherein the Nb compound is any of niobium chloride, niobium hydroxide, ammonium niobium oxalate, niobium oxide and niobium ethoxide.

13. The production method according to claim 9, wherein a carbon source is added to the battery active material obtained after the burning, and then burning is further carried out in a reducing atmosphere.

* * * * *